United States Patent [19]

Muller

[11] Patent Number: 5,172,467
[45] Date of Patent: Dec. 22, 1992

[54] INSTALLATION APPARATUS FOR INSTALLING SELF-ATTACHING FASTENERS

[75] Inventor: Rudolph R. M. Muller, Frankfurt, Fed. Rep. of Germany

[73] Assignee: Multifastener Corporation, Detroit, Mich.

[21] Appl. No.: 791,941

[22] Filed: Nov. 13, 1991

Related U.S. Application Data

[60] Division of Ser. No. 491,925, Mar. 12, 1990, Pat. No. 5,092,725, which is a division of Ser. No. 196,209, May 19, 1988, Pat. No. 4,915,558, which is a division of Ser. No. 892,017, Aug. 1, 1986, Pat. No. 4,765,057, which is a division of Ser. No. 773,387, Sep. 6, 1985, Pat. No. 4,633,560, which is a division of Ser. No. 563,833, Dec. 21, 1983, Pat. No. 4,555,838, which is a continuation-in-part of Ser. No. 485,099, Mar. 28, 1983, Pat. No. 4,459,073, and Ser. No. 504,074, Jun. 12, 1983, Pat. No. 4,543,701, which is a continuation of Ser. No. 229,274, Jan. 28, 1981, abandoned, said Ser. No. 485,099, is a division of Ser. No. 229,274.

[30] Foreign Application Priority Data

Feb. 2, 1980 [DE] Fed. Rep. of Germany ....... 3003908

[51] Int. Cl.⁵ .............................................. B23P 21/00
[52] U.S. Cl. ......................................... 29/716; 29/798
[58] Field of Search .................... 29/432, 432.1, 432.2, 29/714–716, 798, 806; 227/2, 4, 6, 7, 15, 43, 51, 107, 114, 119, 132; 221/270, 276, 278

[56] References Cited

U.S. PATENT DOCUMENTS

| | | | |
|---|---|---|---|
| 4,348,796 | 9/1982 | Smallegan | 29/716 X |
| 4,574,473 | 3/1986 | Sawdon | 29/798 |
| 5,072,518 | 12/1991 | Scott | 29/798 |

Primary Examiner—Joseph M. Gorski
Assistant Examiner—S. Thomas Hughes
Attorney, Agent, or Firm—Dykema Gossett

[57] ABSTRACT

The present disclosure relates to self-piercing fasteners, such as studs, bolts or nuts, the method of attaching such fasteners to a panel and fastener installation apparatus, including the installation head and die button. The fastener includes a self-piercing and riveting annular wall which is driven into a panel supported against a die member by the installation head. The die member includes an annular die cavity surrounding a central projecting die portion which is telescopically receivable in the free open end of the fastener annular wall. The free end of the fastener annular wall includes a piercing surface which mates with a piercing surface at the outer edge of the projecting die portion to pierce a slug from the panel. The panel slug is then pressed into the opening in the annular fastener wall by the conical end of the projecting die portion and the free end of the annular wall is simultaneously deformed radially outwardly in the die cavity forming a rigid mechanical interlock with the pierced panel edge.

12 Claims, 14 Drawing Sheets

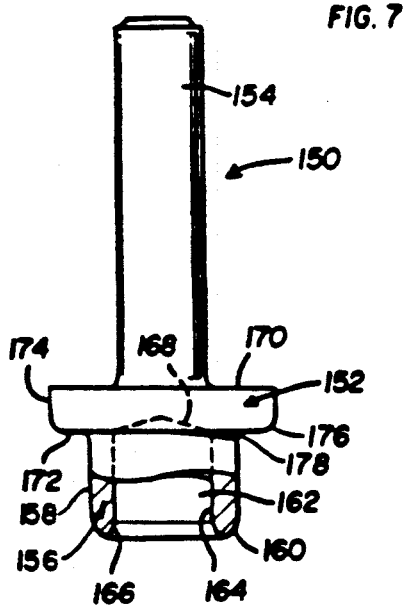
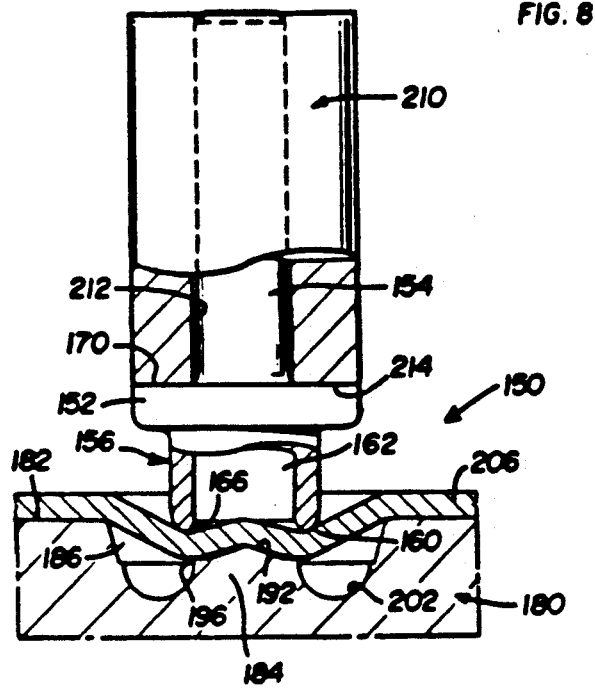
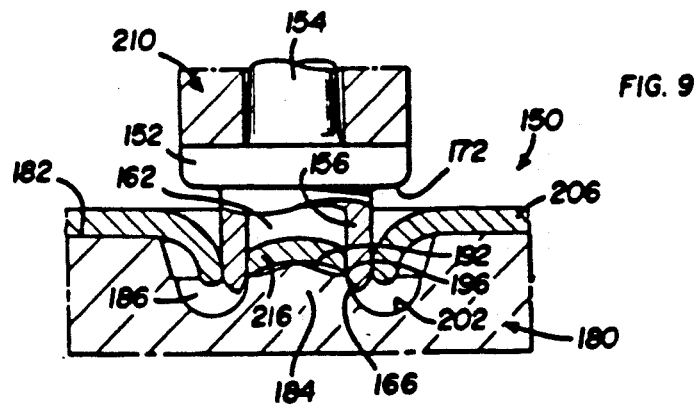
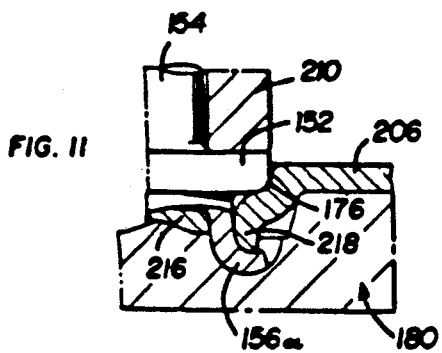
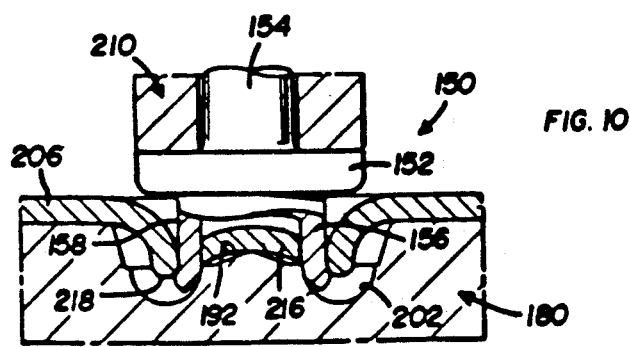

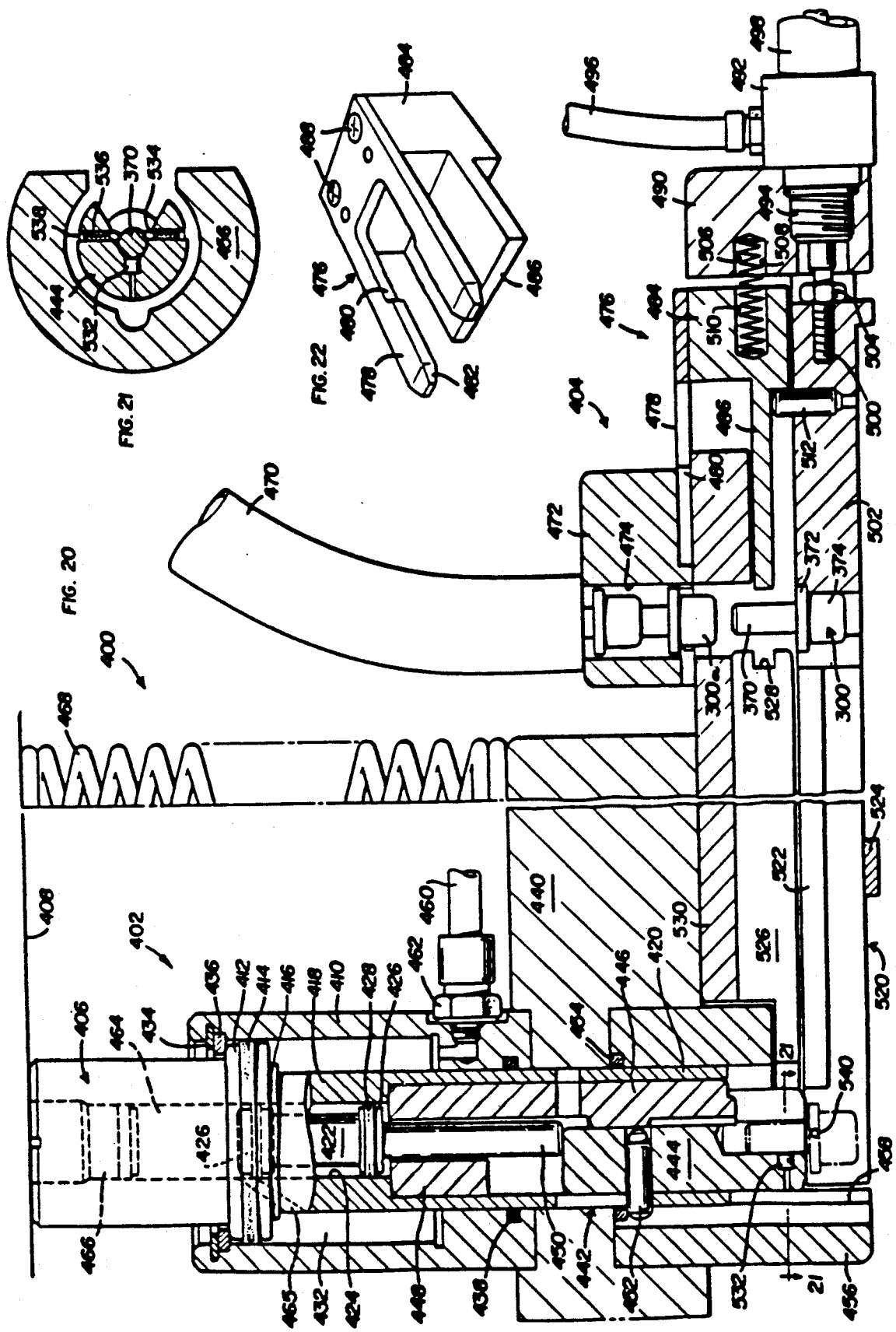

INSTALLATION APPARATUS FOR INSTALLING SELF-ATTACHING FASTENERS

This application is a divisional application of my U.S. patent application Ser. No. 491,925 filed Mar. 12, 1990, now U.S. Pat. No. 5,092,725 which application is a divisional application of my U.S. patent application Ser. No. 196,209 filed May 19, 1988, now U.S. Pat. No. 4,915,558, which application is a divisional application of Ser. No. 892,017, filed Aug. 1, 1986, now U.S. Pat. No. 4,765,057, which application is a divisional application of Ser. No. 773,387, filed Sep. 6, 1985, now U.S. Pat. No. 4,633,560, which application is a divisional application of Ser. No. 563,833, filed Dec. 21, 1983, now U.S. Pat. No. 4,555,838, which application is a continuation-in-part application of Ser. No. 485,099, filed Mar. 28, 1983, Now U.S. Pat. No. 4,459,073 and Ser. No. 504,074, filed Jun. 12, 1983, now U.S. Pat. No. 4,543,701, which applications are, respectively, divisional and continuation applications of Ser. No. 229,274, filed Jan. 28, 1981, now abandoned, which claims priority to an application filed Feb. 2, 1980 in the Federal Republic of Germany, Serial No. 3003908.

The prior art includes self-piercing nuts, which may also be simultaneously clinched to secure the nut in the pierced panel opening, such as disclosed in U.S. Pat. Nos. 3,299,500 and 3,314,138, assigned to the Assignee of the instant application. The prior art also includes a number of self-riveting nuts, including nuts having an annular skirt portion which is deformed radially outwardly in a die member to form a mechanical interlock with the panel, see for example U.S. Pat. Nos. 3,938,239 and 4,018,257. The self-riveting nuts disclosed in these patents are however secured to a panel having a pre-pierced panel opening, requiring at least two separate operations. Further, the nut and panel assembly is not suitable or sufficiently rigid to secure a stud, bolt or other member having a projecting portion extending from the plane of the panel.

The prior art also discloses means of attaching a stud-like fastener, wherein the stud includes an annular end portion which penetrates a plate or structural steel member, which may be deformed radially inwardly around a plug formed in the panel, see for example U.S. Pat. Nos. 4,193,333 and 3,871,264. The disclosed attachment means and method of attachment are not however suitable for many applications, particularly automotive applications requiring a rigid connection between a relatively thin panel and stud-like fastener, which must be rigidly secured to the thin panel.

It is understood that the prior art also includes various riveting techniques, wherein the fastener includes an annular end portion which may be press-fitted through an opening in a panel, which is then riveted or radially outwardly deformed by a die member having an annular semi-toroidal die cavity and may include a projecting central die portion which is received in the annular riveting end of the fastener. Examples of such prior art includes U.S. Pat. Nos. 1,976,019, 2,456,118, 2,521,505, 3,436,803, 3,754,731, 4,039,099 and 4,092,773.

The prior art known to the applicant does not disclose or suggest an installation head suitable for feeding, orienting and driving self-piercing and riveting fasteners of the type described herein in mass production, wherein the annular self-piercing and riveting wall of the fastener must be accurately aligned and oriented with a die member prior to each installation. The prior art does, of course, disclose automatic riveting apparatus and driving tools, however the installation apparatus disclosed in the prior art are not suitable for installing the stud-like fasteners disclosed herein.

The self-attaching fastener of the present invention forms a unique and improved fastener and panel assembly in relatively thin panels and which is sufficiently rigid to secure a stud-like fastener having a projecting end portion. Further, the fastener, method and installation tooling of this invention is suitable for mass production, particularly automotive applications utilizing automatic presses. Finally, the fastener and panel assembly may be formed in one continuous operation in a die press or the like, eliminating the requirement for secondary operations, including prepiercing the panel.

FIELD OF THE INVENTION

The present invention relates to self-piercing and riveting fasteners, including studs, bolts, nuts or the like, the method of attaching such fasteners to a panel and the fastener installation apparatus, including the installation head which feeds, orients and drives the fastener into the panel, and the die button which forms the fastener and panel installation assembly.

SUMMARY OF THE INVENTION

The self-attaching member or fastener of the present invention includes a head or body portion and a self-piercing and riveting annular wall which extends from the body portion. The annular wall includes an outer surface and preferably a generally smooth inner surface terminating in a piercing surface adjacent the free end of the annular wall which pierces a slug from the panel during installation. The panel slug is then disposed in the cavity or chamber in the annular wall, which supports the annular wall against collapse as the free end of the fastener annular wall is deformed radially outwardly to form a mechanical interlock with the panel. In the most preferred embodiment of the self-attaching fastener of this invention, the fastener piercing surface is defined by an outwardly angled annular piercing face or changer extending from adjacent the free end of the annular wall to the inner surface, wherein the panel is pierced along the annular piercing face, forming a panel slug having a diameter slightly greater than the internal diameter of the annular wall and wherein the slug forms a press fit against the inner surface of the annular wall. This embodiment is particularly preferred where the fastener is a stud-like fastener and the inner surface of the annular wall terminates in a bottom wall. The panel slug is then deformed against the chamber bottom wall, securely retaining the slug in the chamber and the slug becomes an integral part of the assembly. In the preferred embodiment of the nut fastener, the piercing surface is a relatively sharp piercing edge adjacent the free inner end of the annular wall and the slug is removed after assembly.

The method of attaching the fastener of this invention includes first locating the fastener opposite a panel with the annular wall free end portion facing the panel and a die member located on the opposite side of the panel. The preferred die member includes an annular concave die cavity surrounding a projecting central die portion which is coaxially aligned with and telescopically receivable within the fastener annular wall opening. The method then includes engaging the panel with the fastener annular wall free end, piercing a slug from the panel, which is supported, centered and carried into the annular wall opening by the projecting central die portion. The annular wall free end portion is then deformed radially outwardly in the concave annular die cavity, forming a mechanical interlock between the fastener annular wall free end portion and the panel portion adjacent the pierced edge.

In the preferred method of this invention, the panel is first deformed by the fastener annular wall free end into the die cavity and against the free end of the projecting central die portion, which is preferably conical, having a relatively sharp apex. The free end of the central die portion then centers, orients, and supports the panel slug in the annular wall opening. Further, the outer edge of the projecting central die portion preferably includes a relatively sharp piercing edge which mates with the piercing surface of the annular wall to pierce a slug from the panel.

The fastener body portion preferably includes a base portion having a side surface and a bottom surface joined by an arcuate surface and the annular wall is preferably integrally joined to the base portion spaced inwardly from the side of the base portion. The method then includes driving the fastener base portion into the panel, after a slug is pierced from the panel, and during the deformation of the fastener annular wall free end, forming a relatively flush mounting of the base portion in the panel. Where the fastener is a stud-like fastener, the shank portion of the stud extends from the flush mounting of the fastener base portion in the panel.

In the most preferred method of this invention, the free end of the fastener annular wall is deformed radially outwardly in the annular die cavity into a generally U-shaped channel in cross-section, and the panel adjacent the pierced panel edge is driven into the U-shaped channel, forming a rigid mechanical interlock between the panel and the fastener annular wall. An annular bead may thus be formed in the edge of the pierced panel opening, locked in the U-shaped channel, forming a particularly rigid assembly.

As described, the preferred die member for securing the self-attaching fastener of this invention to a panel, includes an annular die cavity surrounding a central die portion projecting from the die cavity and preferably includes a panel supporting shoulder located on at least two sides of the die cavity. As described, the free end of the central die portion preferably includes a central conical die surface having a relatively sharp apex which centers, orients and supports the panel slug in the annular wall opening, and the outer edge of the central die portion preferably includes a relatively sharp piercing edge which surrounds the conical die surface. The free end of the central die portion is preferably spaced below the panel supporting shoulder, such that the panel is first deformed into the die cavity, prior to piercing, as described.

In the most preferred embodiment of the die member, the annular die cavity includes a smooth concave arcuate annular die surface extending from adjacent the piercing edge through the bottom surface of the die cavity, which initially receives the inner surface of the fastener annular wall and which deforms the annular wall radially outwardly, as described. The outer surface of the die cavity is preferably inclined outwardly and blends into the panel supporting shoulder in an arcuate surface which receives the panel as it is deformed into the die cavity. In this embodiment of the die member, the annular die cavity includes an annular lip spaced above the bottom surface of the die cavity and below the plane of the panel supporting shoulder. The annular lip supports the panel portion adjacent the pierced panel edge as the pierced panel edge is deformed into the hook or U-shaped channel in the free end of the fastener annular wall and forms the preferred flush-mounted assembly, as described.

The self-piercing and riveting fastener and die member thus comprise a die set assembly forming the preferred fastener and panel assembly in one continuous operation, wherein the panel is first deformed into the die cavity, the panel is then pierced between the mating piercing surfaces of the annular fastener wall and the outer edge of the projecting die portion, and finally, the annular fastener wall is deformed radially outwardly against the bottom surface of the die cavity, and the pierced panel edge is deformed into the hook or U-shaped channel formed in the free end of the annular wall. As described, the preferred embodiment of the fastener and panel assembly includes a relatively rigid mechanical interlock between the self-piercing and riveting annular wall of the fastener and the panel portion adjacent the pierced panel edge. In the preferred embodiment of the assembly, the fastener annular wall portion includes a first tubular portion adjacent the body portion having generally parallel walls and a second radially outwardly hook-shaped end portion. The slug pierced from the main portion of the panel is disposed in the first tubular annular wall portion, preferably in engagement with the internal surface of the first tubular portion. The portion of the panel adjacent the pierced panel edge is preferably displaced from the plane of the main panel portion in engagement with the exterior surface of the first tubular annular wall portion of the fastener and deformed in the hook-shaped portion, forming a strong mechanical interlock between the panel and the fastener annular wall portion. In the most preferred embodiment of the assembly, the pierced panel edge includes an enlarged reinforcing annular bead and the hook-shaped portion of the fastener annular wall is deformed around the bead, forming a rigid assembly.

The installation apparatus of this invention for installing the self-attaching fasteners includes a die member or die button, as already described, and an installation head. The installation head receives the self-attaching fasteners, orients the fasteners for installation and drives the fastener against the panel and into the die member to form the fastener and panel assembly. In a typical application, the die button is located on the bottom shoe of a mechanical, hydraulic or pneumatic press, such as utilized by the automotive industry to form panels, brackets and the like. The installation head may be attached to the upper reciprocating die shoe, such that a fastener is attached to the panel with each stroke of the press. It will be understood, however, that the die press may include several installation apparatus assemblies, wherein several fasteners are installed with each stroke of the press. Further, the arrangement may be reversed, wherein the die button is located on the moveable die member and the installation head is secured to the fixed die press member.

The disclosed installation head or apparatus of this invention is particularly, although not exclusively, adapted for installation of stud-like fasteners having a projecting portion, such as a shank, extending from the body or head portion of the fastener. This type of fastener presents unique installation problems in mass production because the elongated fastener must be accurately oriented in the head and aligned with the die button to prevent damage to the installation apparatus. The installation apparatus of the present invention includes two alternative embodiments of the installation head. The first embodiment includes a base member and a relatively moveable spaced nose member. The nose member includes a first passage receiving the self-attaching fasteners and communicating with a transverse plunger passage. The head includes a plunger moveable with the base member telescopically receivable through the nose plunger passage for driving a fastener through the plunger passage into a panel located opposite the plunger. The plunger passage terminates in a generally conical recess opposite the plunger which receives and supports the self-piercing and riveting wall of the fasteners, thereby centering the fasteners in the plunger passage ready for installation in a panel by the plunger. The free end of the plunger includes a bore configured to receive the free end of the fastener body portion and, upon receipt of a fastener in the plunger passage conical recess, the nose member moves relative to the plunger to first receive the fastener body portion free end in the plunger bore, assuring orientation of a fastener, ready for installation. The installation head also includes actuating means which moves the nose relative to the plunger, through the plunger passage and installs the oriented fastener in the panel.

In the first preferred embodiment of the installation head, the conical recess in the nose member is composed of at least two spring biased members, each member having mating concave generally conical surfaces normally supporting the annular wall portion of the fastener and the plunger is adapted to drive the oriented fastener against the conical surface, spreading the spring biased members and installing the fastener in the panel. In the disclosed embodiment, the base member is attached to the moveable platen of a press and the base and nose members are interconnected by a piston. The piston is adapted to move the nose member, relative to the base member, to receive the fastener body portion free end in the plunger bore and the actuating means then operates the press to close the space between the base and nose members, driving the plunger through the plunger passage to install a fastener in the panel.

The second embodiment of the installation head includes a housing having an elongated plunger reciprocal in a plunger passage, as described above, a feed transfer means transferring fasteners to the plunger passage and the plunger includes a longitudinally extending bore configured to receive the elongated body portion or shank of the stud-like fastener. The end of the plunger is adapted to bear against the body portion of the fastener to drive the fastener into the panel, as described. In the second embodiment of the installation head, however, the plunger is formed of at least two longitudinally extending mating parts intersecting the bore in the end of the plunger, including a first part having a concave portion of the bore facing the transfer means and a second relatively moveable plunger part adapted to close the bore and block the transfer path. The installation head includes actuation means adapted to longitudinally move the second plunger part, relative to the first plunger part, thereby opening the concave bore portion of the first plunger part. The transfer means then transfers a fastener to receive the fastener elongated body portion or shank in the plunger first part bore portion, orienting the fastener for installation. The actuation means then closes the second plunger part around the fastener elongated body portion or shank, ready for installation. Finally, the actuation means drives the plunger through the plunger passage and installs the oriented fastener in the panel.

The self-attaching stud fasteners of the present invention are particularly adapted for transfer from a hopper or other source of fasteners to the installation head through a flexible tube. As described, the stud fasteners include an elongated shank portion and a tubular riveting wall portion generally coaxially aligned with the shank portion and preferably having an internal diameter greater than the external diameter of the shank portion. The fastener may then be collected in the flexible tube as a stack of fasteners wherein each fastener has an elongated shank portion received in the adjacent fastener tubular wall portion and the stack of fasteners is sufficiently flexible for transfer through the flexible tube.

It will be understood that the self-attaching fastener of the present invention may be of almost any configuration. For example, the fastener may be a stud, bolt, nut, ball joint, wherein the end of the shank includes a ball member or other fastening means. As used herein, "fastener" refers not only to the function of the fastener to attach another structural member to the panel, but also the means of attaching the fastener to the panel. It will also be understood that the self-attaching fastener, method of attachment and installation apparatus is a complete system, wherein the installation apparatus is specifically adapted to install the self-attaching fastener of this invention by the method of this invention, preferably in a continuous operation. The resultant fastener and panel assembly is also unique, wherein the mechanical interlock between the self-piercing and riveting wall is extremely rigid and stronger than the panel to which the fastener is installed.

Other advantages and meritorious features will be more fully understood from the following description of the preferred embodiments of the fastener, method of installation and the installation apparatus, the appended claims and the drawings, a brief description of which follows.

BRIEF DESCRIPTION OF THE DRAWINGS

FIG. 7 is a partially cross-sectioned side elevation of another embodiment of the self-attaching fastener of this invention in the form of a stud;

FIGS. 8 to 11 are partially cross-sectioned views of the self-attaching stud shown in FIG. 7 and an alternative embodiment of the installation apparatus illustrating the sequence of installation of the stud of FIG. 7 in a panel;

FIG. 20 is a side partially cross-sectioned view of another embodiment of the installation head apparatus of this invention;

FIG. 21 is a top elevation of the nose assembly shown in FIG. 20 in the direction of view arrows 21—21;

FIG. 22 is a top perspective view of the stop means of the transfer mechanism in the installation head apparatus of FIG. 20;

DESCRIPTION OF THE PREFERRED EMBODIMENTS OF THE INVENTION

As described above, the self-attaching fastener of this invention is particularly adapted for permanent attachment of the fastener to a plate or panel, particularly a metal sheet or the like, such as utilized in the automotive industry for component parts. The self-attaching fastener and installation apparatus of this invention is particularly suitable for installation in a conventional press, such as utilized by the automotive industry to form sheet metal parts, including body panels and the like. In such applications, the press installs one or more fasteners with each stroke of the press, wherein the fastener becomes a permanent part of the panel and is utilized to affix other structural members, such as brackets or the like to the panel. Further, as described above, the self-attaching fastener of this invention is particularly suitable for attachment to relatively thin sheets or panels, such as utilized by the automotive and appliance industries. As used herein, "panel" refers to any plate, panel or metal sheet having a thickness thin enough for the annular self-piercing and riveting wall to penetrate the panel and provide sufficient clearance for riveting attachment, as described.

Figure 1:
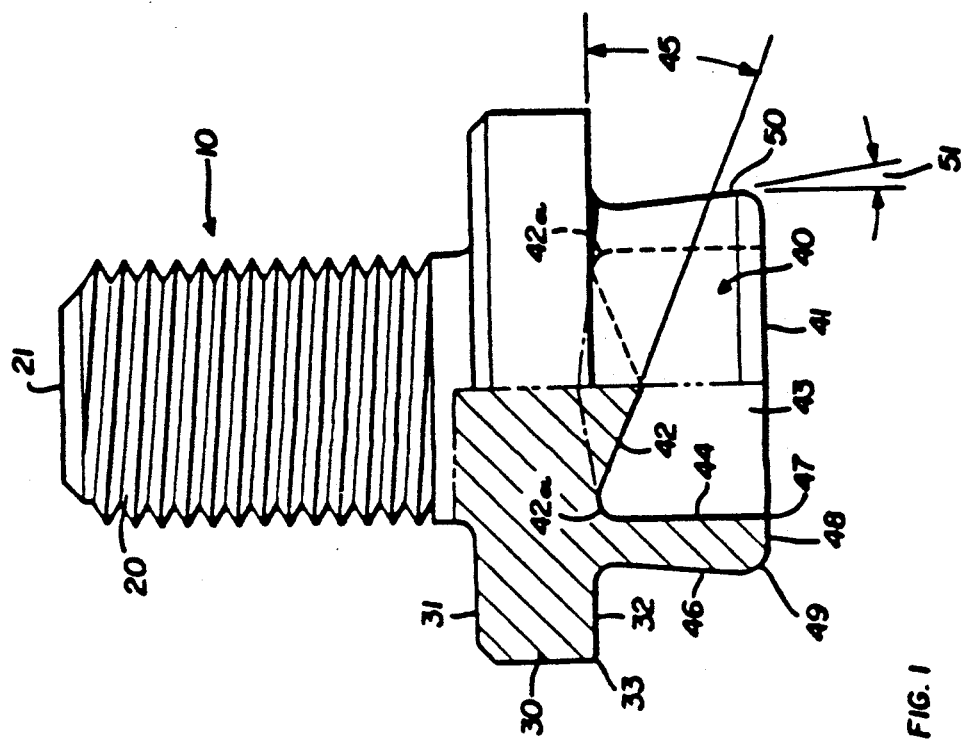
FIG. 1 is a side, partially cross-sectioned view of one embodiment of the self-attaching fastener of this invention in the form of a threaded bolt.

FIG. 1 illustrates a self-piercing and riveting bolt 10 which consists essentially of a cylindrical shank 20 having an external thread, a head portion or flange extending radially outwardly from the shank portion and an annular piercing and riveting portion 40 coaxially aligned with the shank portion and forming an extension of the shank axis on the side of the head 30 remote from the shank 20.

More specifically, the head 30 of the self-attaching bolt shown in FIG. 1 is situated on the end surface opposite the free end 21 of the shank and includes an annular pressing surface 31 which surrounds the shank 20. The opposite side of the head portion includes an annular bearing surface 32 surrounding the self-piercing and riveting portion and bounded by a stamping edge 33. The free end portion 41 of the annular wall includes an opening into a central recess 43 which tapers slightly conically to a bottom wall 42. In the disclosed embodiment, the bottom wall 42 is conical and convex, extending at an angle 45 obliquely from the axis of the self-attaching bolt 10. The outer edge 42a of the conical bottom wall 42 and the bearing surface 32 lie in approximately the same plane in the disclosed embodiment. As disclosed more fully hereinbelow, the bottom wall 42 of the recess 43 of the stud type fasteners may be either convex or concave to accomodate various panel thicknesses.

The free end 41 of the annular wall 46 includes a cutting or piercing edge 47, which bounds the central recess 43, and an annular arcuate driving and drawing surface 48. The driving and drawing surface 48 is oriented generally perpendicular to the axis of the self-attaching bolt 10 and the outer surface of the free end of the annular wall includes a rounded driving and drawing surface 49 interconnecting the drawing surface 48 and the external keying wall 50. In the disclosed embodiment of the self-attaching bolt, the keying wall 50 tapers from the driving and drawing surface 49 towards the head portion 30 at a clearance angle 51 relative to the axis of the bolt 10 and blends into the bearing surface 32 of the head 30 in an arcuate surface.

Figure 2:
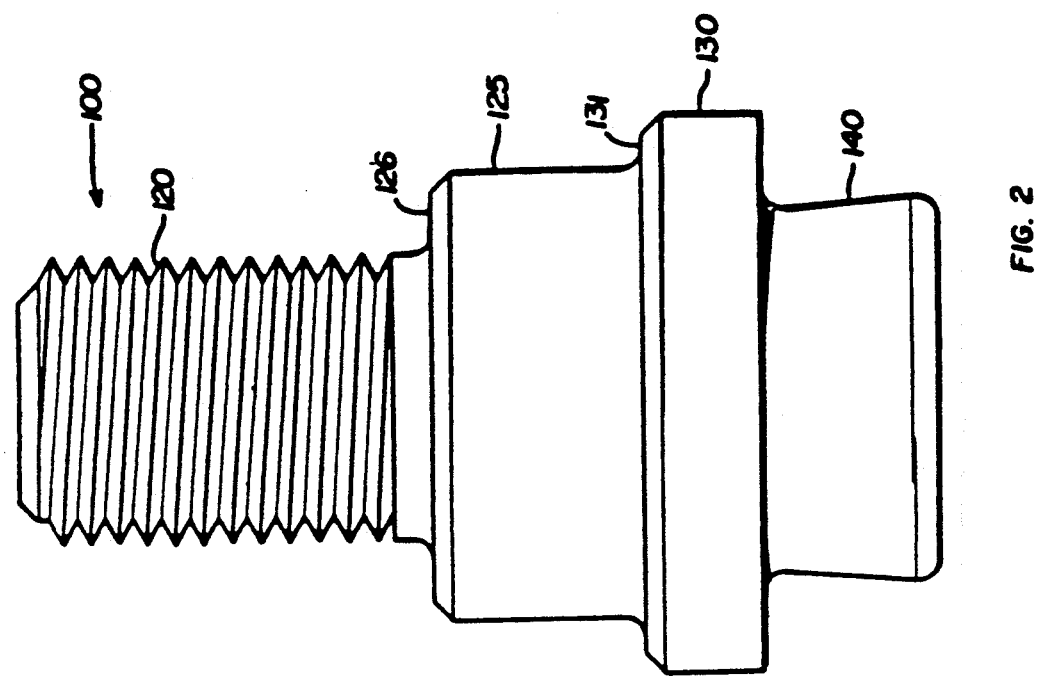
FIG. 2 is a side view of a second embodiment of the self-attaching bolt of this invention.

FIG. 2 illustrates a second embodiment of the self-attaching fastener in the form of a self-piercing and riveting screw fastener 100. The screw fastener of FIG. 2 differs from the self-piercing bolt 10 of FIG. 1 in that a guiding and spacing step 125 is located on the axis of the riveting screw between the end face of the threaded shank 120 and the head 130. The guiding and spacing step 125 includes an annular pressing surface 126 which surrounds the shank 120 and includes a transition at a shoulder into an adjacent pressing surface 131 of the head 130.

Figure 3:
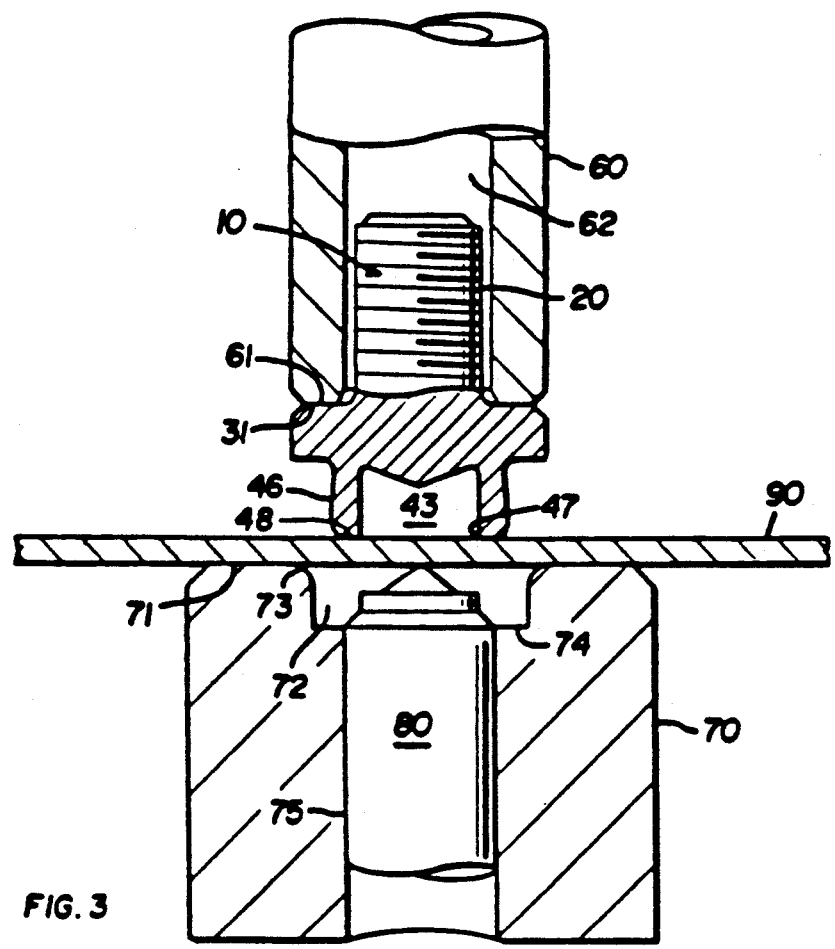
FIG. 3 is a partially cross-sectioned side view of the embodiment of the self-attaching bolt shown in FIG. 1 ready for installation in a panel, including one embodiment of the installation apparatus.

The installation apparatus shown in FIG. 3 includes a plunger or pressing die 60 and a female die or die button 70 having a central counter-hole die or bore 80. The pressing die or plunger 60 may be a component of a relatively complex installation system which includes an installation head, shuttle and transfer means, as described more fully hereinbelow. The pressing die or plunger includes a central recess or bore 62 which receives the shank 20 of the bolt fastener and an annular end portion 61 which engages the pressing surface 31 of the body portion of the fastener. In the disclosed embodiment of the installation apparatus, a self-piercing and riveting screw or bolt 10 as shown in FIG. 1 is located ready for installation with the threaded shank 20 received in the central recess 62 and the annular pressing surface 61 of the die 60 engaging the pressing surface 31 of the bolt 10. The drawing surface 48 at the free end of the annular wall 46 bears against the panel 90. It will be noted that the panel 90 is generally perpendicular to the longitudinal axis of the self-piercing and riveting bolt 10 and the panel is supported on the seating surface 71 of the female die 70. The female die 70 includes an axial depression or concave die cavity 72 which is coaxially aligned with the annular wall 40 and the panel supporting or seating surface 71 is connected to the die cavity through a blending radius 73. The die cavity 72 includes a bottom wall 74 which, in the disclosed embodiment, is generally parallel to the seating surface 71 and includes a central cylindrical bore 75.

Figure 4:
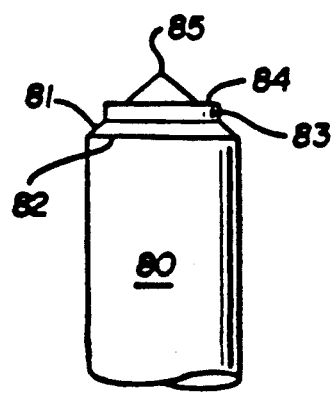
FIG. 4 is a side view of the center die portion shown in FIG. 3.

In the embodiment of the die assembly shown in FIG. 1, a cylindrical counter-hole die 80 is telescopically located in the central die bore 75. In the embodiment of the female die assembly shown in FIG. 3, one free end of the counter-hole die 80 penetrates into the die cavity 72 of the female die or die button 70 forming an annular die cavity. As shown in FIG. 4, the free end of the counter-hole die 80 includes a truncated conical splaying body 81, the base 82 of which is situated at approximately the level of the bottom wall 74 of the die cavity 72 and which extends generally as far as a cylindrical cutting projection 83. This cutting projection 83 has a diameter generally equal to the internal diameter of the recess 43 of the self-piercing and riveting bolt 10 and is radially bounded at the free end face by a cutting edge 84 which mates and cooperates with the cutting edge 47 of the self-attaching bolt 10 to pierce a slug from the panel 90. Further, the cutting projection 83 includes a central splaying cone 85 on its free end surface which prevents lateral relative movement of the panel slug upon first contact of the cone with the panel.

Figure 6:
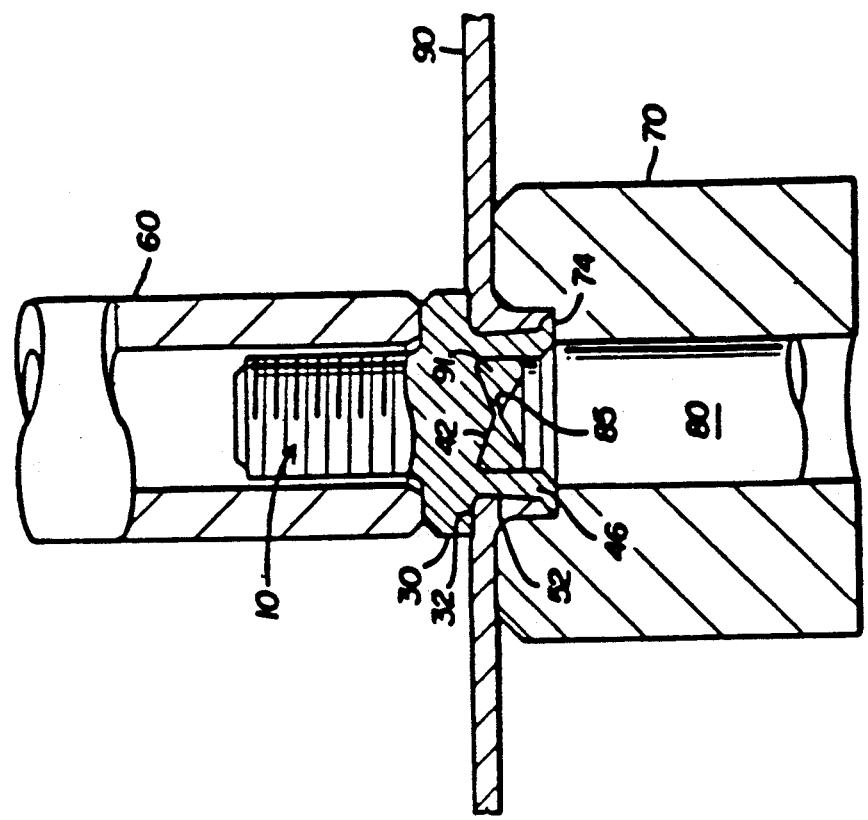
FIGS. 5 and 6 are partially cross-sectioned side elevations of the self-attaching bolt and installation apparatus shown in FIG. 3 illustrating the sequence of installation.
Figure 5:
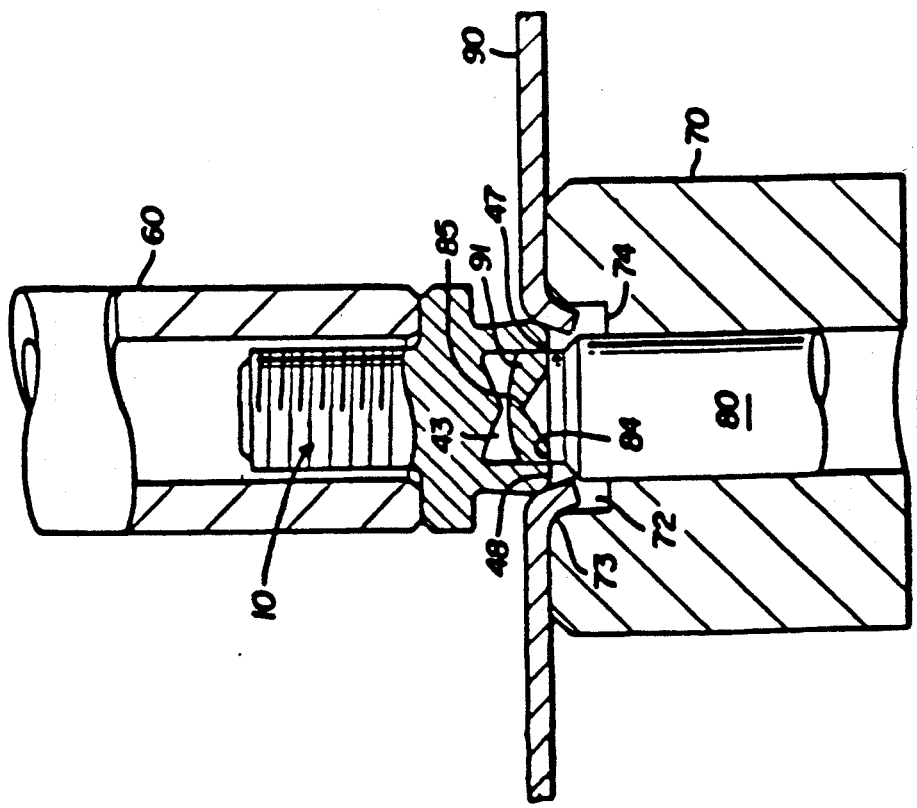

It will be understood that an intermediate step in the disclosed process includes inserting the self-attaching bolt 10 in the recess 62 of the die member or plunger 60 as will be described more fully hereinbelow. The plunger 60 then moves relative to the female die member 70 to pierce the panel and install the bolt fastener as illustrated in FIGS. 5 and 6.

As the pressing die or plunger 60 moves with the self-piercing and riveting bolt 10 relative to the female die 70 with the counter-hole die 80 and panel 90, the portion of the panel covering the depression or die cavity 72 in the female die is deformed into the die cavity by the driving and drawing surface 48 of the self-attaching bolt around the bending radius 73 and into the female cavity 72 of the female die 70. The panel is then pierced or sheared between the piercing or cutting edge 47 of the self-riveting bolt 10 and the cutting edge 84 of the counter-hole die 90, forming a slug 91, generally corresponding in diameter to the internal diameter of the recess 43 of the annular wall of the self-attaching bolt 10. The slug is punched or trepanned out of the panel by the mating piercing surfaces as shown in FIG. 5. The panel slug 91, which is domed over the splaying cone 85 of the counter-hole die 80, is pushed during the further movement of the splaying cone 85 into the conically tapering recess 43 in the annular wall.

During continued relative movements of the self-attaching bolt 10 and the female die assembly, the annular wall 46 of the bolt 10 is pressed against the exterior wall surface of the splaying body 81 on the counter-hole die 80 and the free end of the annular wall is deformed radially outwardly in an L-shape against the bottom wall 74 of the female die cavity 72. An annular peripheral groove 52 is thus formed in the riveting wall 46 which is defined by the L-shaped riveting wall 46 and the bearing surface 32 of the fastener head 30. The portion of the panel 90 which is deformed into the female die cavity 72 is then deformed inwardly into the peripheral groove 52, forming a secure fastener and panel assembly.

Simultaneously, the slug 91 pierced from the panel is pressed by the splaying cone 85 against the convex conical bottom wall 42 of the recess 43 in the stud bolt 10. The opposed conical surfaces of the splaying cone 85 and the bottom wall 42 of the recess deform the slug 91 radially outwardly, firmly jamming the slug in the recess 43 against the inner wall. The bearing surface 32 of the body portion of the self-attaching bolt 10 is simultaneously pressed into the opposed surface of the panel 90 as shown in FIG. 6. As the bearing surface 32 is pressed into the panel surface, the riveted connection of the annular wall 46 and the panel 90 is formed. In the final assembly, the annular wall 46 is located between the panel portion bearing against the annular wall and the panel slug 91, which is firmly jammed in the recess 43. The self-attaching bolt 10 is thus firmly and non rotatably mounted on the panel 90 in one continuous operation, without additional securing means or special forming operations.

The panel slug 91 thus performs an important function in the installation process and becomes an integral part of the assembly in the stud-like fasteners shown in FIGS. 1 and 2 having an enclosed recess 43. The slug is centered and supported on the free conical end 85 of the counter-hole die 80 and is located in the annular wall recess generally at the location of the greatest inward stress. For example, the panel slug 91 is located at the opening of the recess 43 immediately following piercing, as shown in FIG. 5, thus preventing collapse of the annular wall as the pierced panel edge is deformed into the die cavity against the external surface of the annular wall, as shown. The slug is continuously moved into the recess as the annular wall 46 is deformed radially outwardly, reinforcing the annular wall during the radial deformation of the free end of the wall. Finally, the slug is deformed against the bottom wall 42 of the recess, as shown in FIG. 6, reinforcing the fastener and panel assembly and forming an integral part of the assembly, as described.

It will be understood that the shape of the annular wall 46 and the configuration of the fastener portion will be dependent upon the particular function of the fastener. For example, the annular wall 46 may be cylindrical, hexagonal, octagonal or other annular configurations. The fastening portion 20 may be threaded or unthreaded, the shank may include a ball, clevis or other fastening means or the entire configuration may be changed for a particular application.

FIG. 7 illustrates another embodiment of the self-attaching fastener of this invention in the form of a stud fastener 150. The stud fastener includes a head or body portion 152 in the form of a radial flange, an unthreaded shank portion 152 and a self-piercing and riveting annular wall 156. The outer surface 158 of the annular wall in the disclosed embodiment is generally cylindrical and terminates in a rounded driving and drawing surface 160. The annular wall includes a central recess 162 opening through the free end of the annular wall. The inner surface 164 of the annular wall is also generally cylindrical in the disclosed embodiment and terminates in a piercing surface 166 adjacent the free end of the annular wall. The recess 162 terminates in a bottom wall 168, which in the disclosed embodiment is conical and concave.

The top surface 170 of the head 152 provides an annular pressing surface adjacent the shank 154 of the stud and the bottom surface 172 of the head defines an annular bearing surface, as described above. The side surface 174 of the head smoothly blends into the bottom surface 172 in a rounded or arcuate surface 176 and the bottom surface 172 of the head smoothly blends into the outer surface 158 of the annular wall through a rounded or arcuate surface 178. It will be understood that "top" and "bottom" are relative terms depending upon the orientation of the stud fastener and are used herein only for descriptive purposes. As described above, the self-attaching fastener of this invention may be attached with the die member or button located either on the top or the bottom shoe of a die press, for example. Further, the annular wall 156 may be any annular configuration, including cylindrical, hexagonal, octagonal, etc. The stud fastener of FIG. 7 is, however, a simplified and therefore less expensive embodiment of the self-attaching fastener of this invention as the outer and inner surfaces (158 and 164) of the annular wall are parallel.

Figure 12:
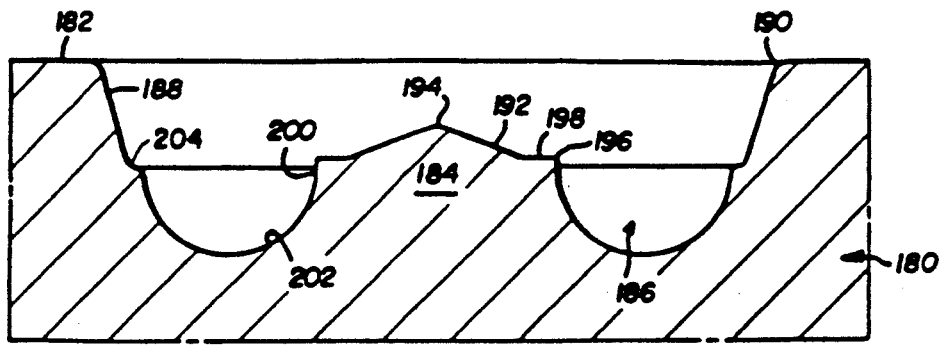
FIG. 12 is a side cross-sectional view of the die member shown in FIGS. 8 to 11.

FIG. 12 illustrates a preferred embodiment of the female die member or die button 180. The die button includes a panel supporting or seating shoulder 182, a central die portion 184 projecting from an annular die cavity 186. The outer surface 188 of the die cavity is inclined or sloped inwardly from the panel supporting shoulder 182, preferably in an "e function" and the inclined outer die surface 188 blends into the panel supporting shoulder 182 in a smooth arcuate surface 190. The free end of the central projecting die portion 184 includes a convex conical surface 192, preferably including a relatively sharp apex 194. The outer edge of the central projecting die portion 184 includes a relatively sharp piercing or shearing edge 196 which is defined by an annular flat surface 198 on the free end of the central projecting die portion and a flat or cylindrical surface 200 at the upper side of the central projecting die portion. The bottom surface 202 of the annular die cavity is semi-toroidal and terminates in an annular lip 204 adjacent the inclined or sloping outer surface 188. The annular lip 204 blends into the bottom surface 202 and the outer sloping die surface 188 through arcuate die surfaces.

FIGS. 8 to 11 and 14 illustrate the preferred installation sequence of the stud fastener of FIG. 7 in the die button of FIG. 12 and a preferred embodiment of the method of installing the self-attaching fastener of this invention. As described above, the stud fastener 150 is first oriented relative to the panel 206 to which the fastener is to be installed with the self-piercing and riveting annular wall 156 facing the panel. The axis of the stud fastener is generally perpendicular to the plane of the panel 206. In the disclosed embodiment of the installation apparatus shown in FIGS. 8 to 11 and 14, the stud fastener 150 is driven into the panel by a pressing die or plunger 210 which has an axial recess or bore 212 which receives the shank 154 of the stud fastener. The plunger includes an annular driving or pressing surface 214 which bears against the annular pressing surface 170 of the fastener head 152. The stud fastener is then driven into the panel by relatively moving the plunger 210 and the die button 180, as will now be described.

As shown in FIG. 8, the panel 206 is first deformed into the die cavity 186. The panel is first engaged by the rounded driving and drawing surface 160 at the free end of the annular wall 156 as described above. The panel portion located inside the annular wall 156 is then domed or trepanned against the conical surface 192 of the free end of the central projecting die portion 184, fixing this portion of the panel prior to piercing or shearing, as will now be described.

The panel is then pierced or sheared as shown in FIG. 9. The panel is sheared between the shearing or piercing surface 166, adjacent the free end of the fastener annular wall 156, and the piercing edge 196 at the outer edge of the projecting central die portion 184, forming a panel slug 216 which is disposed within the fastener annular wall recess 162 on the conical free end of the projecting die portion 184. It will be understood that the configuration of the die button piercing edge 196 (i.e. circular, hexagonal, octagonal, etc.) should be the same as the annular wall 156, such that the piercing surfaces mate to shear or pierce the panel. The piercing surface 166 of the annular wall 156 is preferably a chamfer face inclined outwardly from the axis of the annular wall recess 162. The shearing of the panel then occurs along the shearing face 166, forming a panel slug 216 having an external diameter slightly greater than the internal diameter of the inner face 164 of the annular wall, providing an interference fit. The inclined shearing face 166 is "self-correcting" and assures a clean shearing of the panel with a minimum of force. The elimination of a sharp cutting edge on the annular wall also reduces splitting of the free end of the annular wall and the pierced panel edge during the final installation, as will be described hereinbelow.

As shown in FIG. 10, the continued relative movement of the self-attaching stud fastener 150 and the die member 180 results in the engagement of the free end of the annular wall 156 against the semi-toroidal arcuate bottom surface 202 of the die cavity, simultaneously drawing the portion of the main panel adjacent the pierced panel edge 218 against the external surface 158 of the annular wall 156. It should be noted again that the panel slug 216 is thus located at the point of greatest stress in the annular wall, just beyond the point of contact between the free end of the annular wall 156 and the concave semi-toroidal bottom surface 202 of the annular die cavity. The panel slug thus prevents inward collapse of the annular wall during the installation. Continued relative movements of the stud fastener 150 and the die button 180 deforms the free end of the annular wall radially outwardly against the arcuate surface 202 of the die cavity, forming a hook or U-shaped channel in the cross-section at the free end of the annular wall, as shown in FIG. 11.

The panel portion adjacent the pierced panel edge 218 is then trapped between the hooked end 156a at the free end of the annular wall 156 and the head portion 152 of the stud fastener as the radial surface 176 of the head is driven into the panel. It should be noted that the panel slug 216 has been moved into the annular wall recess 162 and is again located at the point of greatest stress on the annular wall. It should also be noted that the conical surface 192 of the central projecting die portion 184 has prevented any lateral movement of the panel slug 216 in the annular wall recess which would adversely affect the forming of the mechanical interlock between the panel and the fastener annular wall. Continued relative movement between the stud fastener 150 and the die button 180 causes counter rotation of the panel portion 218 adjacent the pierced panel edge in the channel defined by the stud fastener head portion 152 and the radially outwardly deforming annular wall free end 156a, as best shown in FIG. 14.

Figure 14:
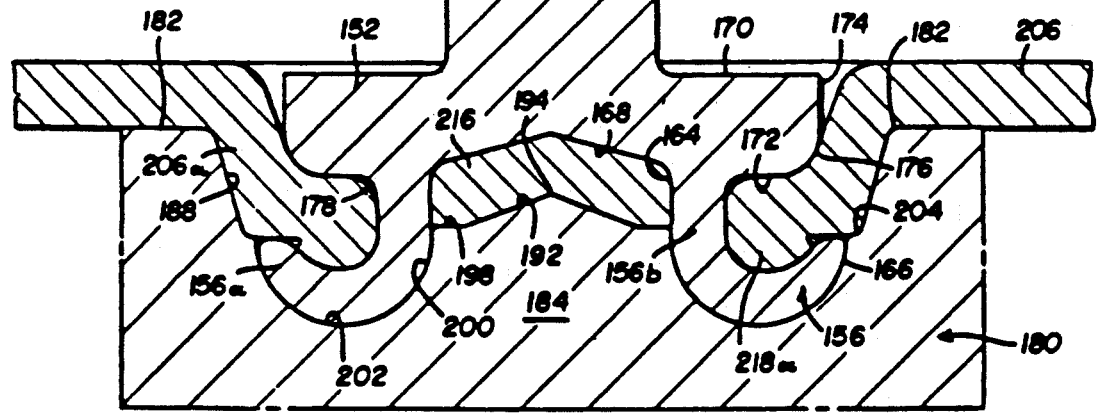
FIG. 14 is a side partially cross-sectioned view of the stud and panel assembly formed in the method sequence illustrated in FIGS. 8 to 11.

FIG. 14 illustrates the final configuration of the stud fastener and panel assembly of this invention. The annular wall 156 now includes a first tubular portion 156b and a second radially outwardly hook-shaped end portion 156a. The slug 216, which was pierced from the main portion of the panel 206, has been deformed against the bottom wall surface 168 of the recess by the conical free end 192 of the central projecting die portion 184. The deformation of the panel slug against the bottom surface 168 of the recess deforms the slug radially outwardly into firm binding contact with the inner surface 164 of the recess, such that the panel slug becomes an integral part of the fastener and panel assembly.

The panel 206 now includes a main portion bearing against the panel supporting shoulder 182, a second portion 206a displaced from the plane of the main panel and bearing against the inclined outer wall 188 of the die cavity and the annular lip 204, which has limited the deformation of the panel into the die cavity and which supported the panel during the final deformation of the panel in the hook-shaped end portion 156a of the annular wall. As described, the panel portion immediately adjacent the pierced panel edge is counter rotated between the bottom surface 172 of the fastener head portion 152 and the hook-shaped end portion 156a of the annular wall, resulting in an enlarged annular bead 218a which is securely trapped in the hook-shaped end portion 156a of the annular wall. The annular bead 218a further reinforces the assembly. Finally, the fastener head portion 152 has been driven into the panel, as described, such that the top surface 170 is generally parallel to the adjacent surface of the main portion of the panel 206, resulting in a flush mounting, which is particularly advantageous in many applications where a second structural member, such as a panel, is attached to the shank portion 154 of the stud fastener. It should also be noted that the piercing or shearing edge 166 has been deformed and rotated, and is now located at the outer extremity of the hook-shaped annular wall portion 156a, preventing splitting of the panel or the riveting end of the fastener.

Figure 13:
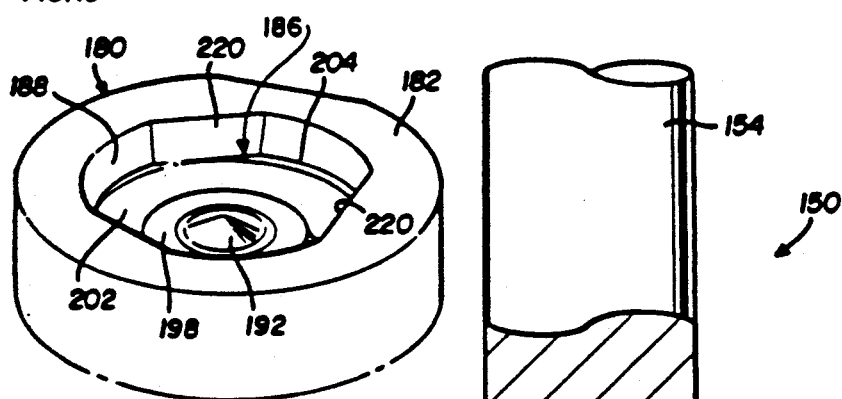
FIG. 13 is a top perspective view of one embodiment of the die member shown in FIG. 12.

The resultant fastener and panel assembly shown in FIG. 14 is extremely strong and rigid, which is particularly important in a stud-like fastener assembly having a shank portion extending from the plane of the panel 206. The push-through or pull-out strength of the assembly is actually greater than the strength of the stud shank 154, in most applications. The pull-out strength is measured by pulling the stud shank 154 in the same direction as the stud fastener was installed, against the panel. The push-through strength of the assembly is measured by pushing the stud fastener through the panel. Anti-rotation means may also be included in the die assembly, such as shown in FIG. 13, wherein the torque strength of the assembly is as great as the stud. In the embodiment of the die button 180 shown in FIG. 13, three flats 220 are provided on the outer inclined wall 188. The flats 220 in the disclosed embodiment are generally parallel to the axis of the conical free end 192 of the central die portion and the flats extend from the annular lip 204 to the bearing surface 182 of the die button. The flats deform the panel draw and very slightly deform the stud flange, providing excellent anti-rotation means.

As used herein, a piercing or shearing "surface" includes a relatively sharp piercing edge, such as the sharp piercing edge 47 of the self-attaching bolt shown in FIG. 1 and the piercing chamfer face 166 on the self-attaching stud shown in in FIG. 7. A sharp piercing edge may be preferred in certain applications where the panel slug is finally removed from the assembly, such as the self-piercing nut shown in FIGS. 27 to 29. A chamfered piercing face is, however, preferred where the panel slug becomes an integral part of the fastener and panel assembly, as described above in regard to the stud fastener of FIG. 7. The installation apparatus described to this point includes a die button and a simple pressing tool or plunger which may be utilized in low production. The fastener may be simply inserted in the plunger and the plunger is driven toward the die button to install the fastener. In mass production, however, the self-attaching fasteners must be fed to the plunger and automatically oriented and aligned for installation. The automatic feeding, alignment and installation of stud-like fasteners having a projecting shank portion, however, presents unique problems because the fastener must be very accurately aligned with the die button prior to each installation. Two alternative installation heads particularly adapted for feeding and installing stud-like fasteners will now be described.

The installation head apparatus 250 shown in FIGS. 15 to 19, is particularly although not exclusively adapted for installing self-attaching stud-like fasteners, such as the self-attaching bolt, screw and stud fasteners shown in FIGS. 1, 2 and 7. As described, the stud-like fasteners 300 include a head or body portion 312, a threaded or unthreaded shank portion 370 and a self-piercing and riveting annular wall or skirt portion 374. This type of fastener must be accurately oriented and aligned relative to the plunger or pressing member and the die button, not shown. The die button will normally be fixed relative to the stationary die member or shoe and the installation head apparatus is normally fixed to the moveable die shoe. As described, however, this arrangement may be reversed.

Figure 15:
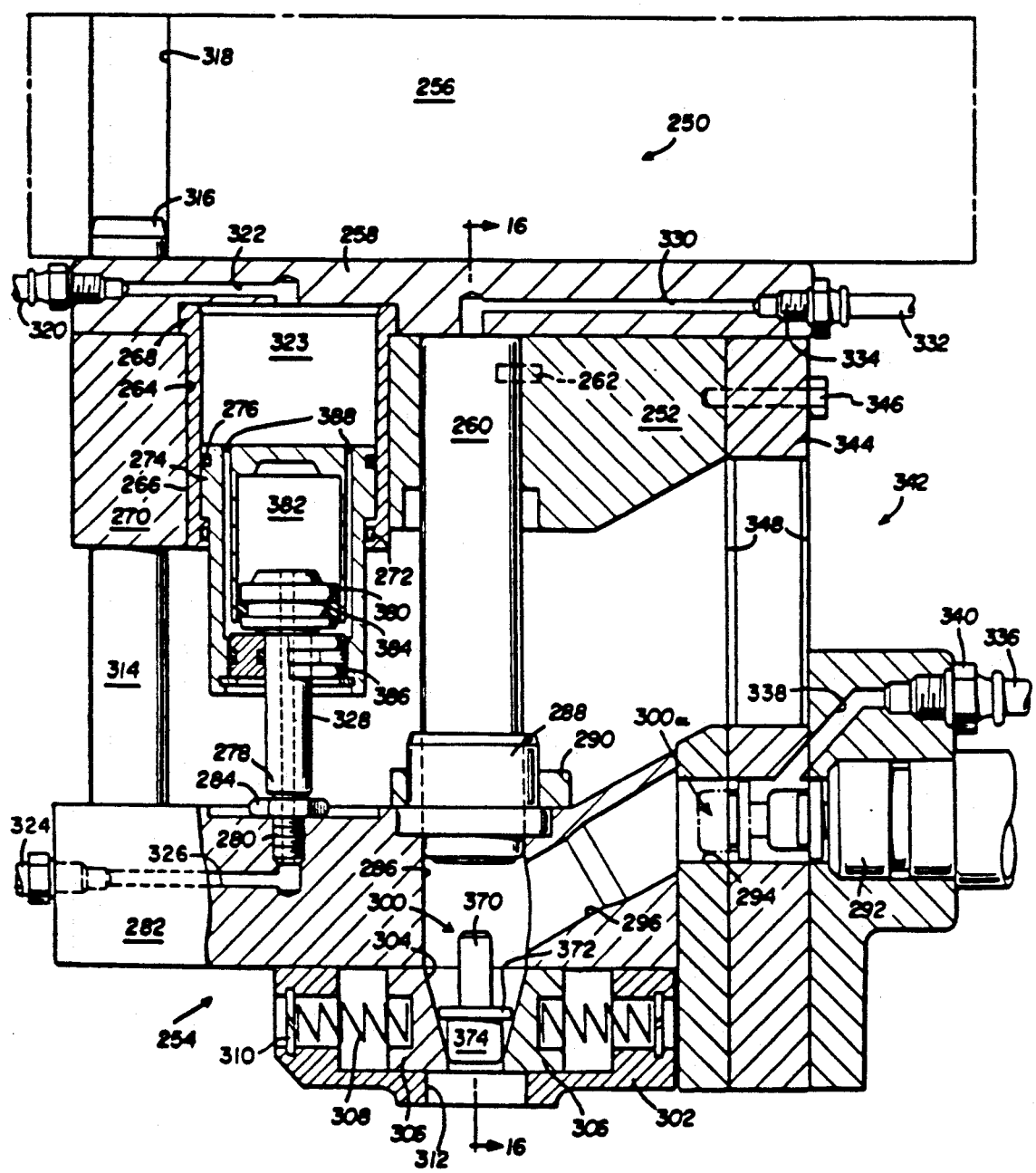
FIG. 15 is a side partially cross-sectioned view of one embodiment of the installation head apparatus of this invention with a self-attaching stud fastener ready for installation.

The installation head 250 shown in FIG. 15 includes a base member 252 and a relatively moveable nose assembly 254. The base member 252 is attached in the disclosed embodiment to the upper moveable die shoe 256 by a back-up plate 258. The plunger 260, which is cylindrical in the disclosed embodiment, is fixed to the base member 252 by a transverse pin 262, or other suitable means. The relative movement between the base member 252 and the more assembly 254 is controlled by a piston assembly 264, which in the disclosed embodiment is a double acting pneumatic piston. The piston assembly 264 includes a piston cylinder 266, which is fixed to the back-up plate 258 by a radial flange 268 and sleeve 270. The piston cylinder 266 includes an internal O-ring 272, which seals the lower end of the piston chamber. The piston assembly includes a piston head 274 having a conventional sealing ring 276 and the piston includes a rod end 278 having a threaded end portion 280 which is threadably received in the magazine plate 282 of the nose assembly. A lock nut 284 prevents unthreading of the rod end 278 from the magazine plate 282.

The magazine plate 282 of the nose assembly 254 includes a cylindrical plunger passage 286 which telescopically receives the plunger 260 during installation of the self-attaching stud fasteners, as described hereinbelow. The magazine plate 282 also includes a guide bushing 288, which slideably receives the plunger 260, such as a conventional brass bushing which is secured to the magazine plate by a stop ring 290. The stop ring 290 also limits the relative movement of the nose assembly 254 and the base member 252. In the disclosed embodiment, the stop ring 290 is a steel ring which is press fitted over the brass guide bushing 288. Self-attaching fasteners 300 are received through a flexible tube, as described hereinbelow, through a conventional tube coupling 292, which may be a conventional quick connect coupling. The magazine plate 282 includes a first passage 294 which receives the self-attaching fasteners 300 from the flexible tube, and a second downwardly angled passage 296, which is transverse to the plunger passage 286 and which communicates with the plunger passage to transfer self-attaching fasteners 300 from a source of fasteners, such as a hopper, through the tube coupling 292 into the plunger passage under gravity.

Figure 16:
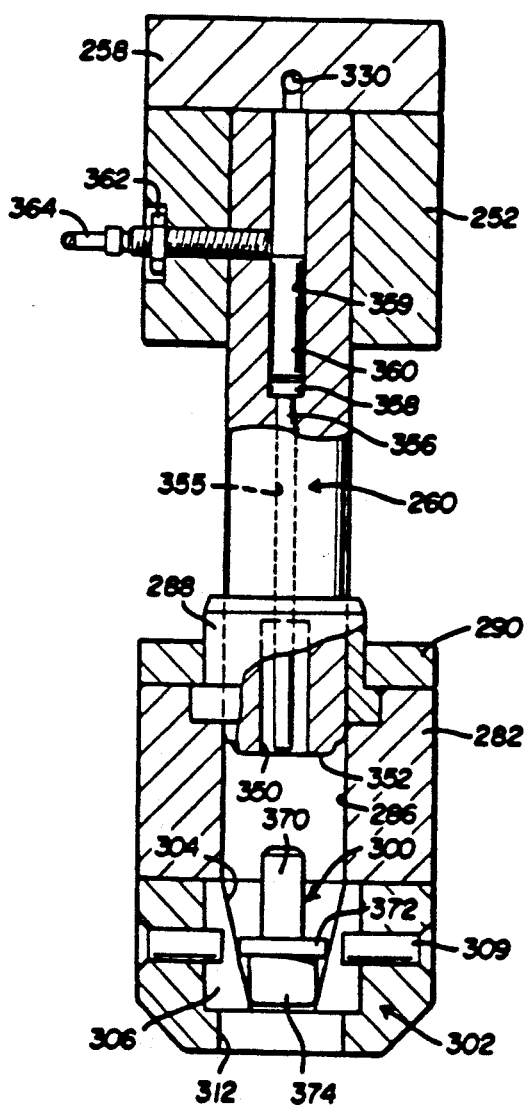
FIG. 16 is an end partially cross-sectioned view of the installation apparatus shown in FIG. 15 in the direction of view arrows 16—16.
Figure 19:
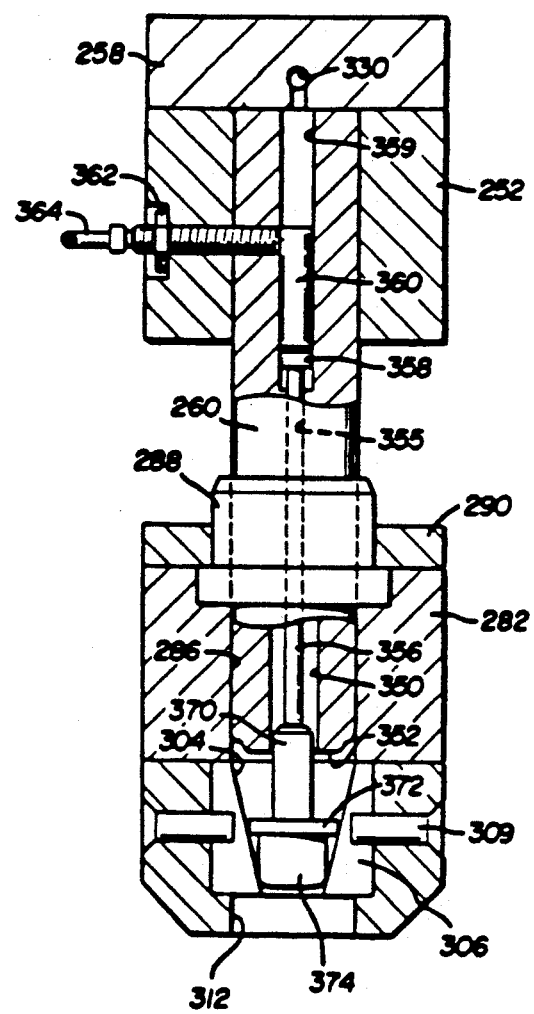
FIG. 19 is an end partially cross-sectioned view of the installation head apparatus shown in FIGS. 15 to 17 in the position shown in FIG. 17.
Figure 18:
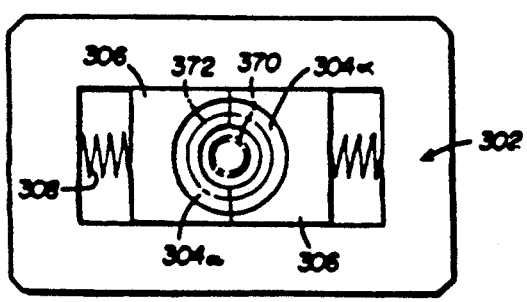
FIG. 18 is a top elevation of the nose assembly shown in FIGS. 15 and 17, in the direction of view arrows 18—18.

The self-attaching stud-like fasteners 300 are then received in a conical opening or recess 304 in the nose 302 which is attached to the magazine plate 282 by screws or other conventional fasteners. The conical opening 304 is provided by two spring biased slide members 306, each having a semi conical surface 304a as shown in FIG. 18. The slide members 306 are each spring biased in the disclosed embodiment by a coil spring 308, which is spring biased at one end against the slide member and against a snap ring 310 at its opposite end. The coil springs normally close the slide members 306 to retain a stud-like fastener 300 as shown in FIGS. 15 and 18. As shown in FIGS. 16 and 19, screws 309 are threaded into the sides of the nose 302, between the slide members which aid in locating the slide members. The nose 302 also includes a cylindrical opening 312 which is coaxially aligned and communicates with the conical opening 304 in the slide members and the plunger passage 286 in the magazine plate.

The magazine plate 282 includes a guide post 314 which is fixed relative to the magazine plate by a pin or the like, not shown, and which includes an end 316 telescopically receivable in a cylindrical opening or bore 318 in the upper die shoe 256. A pneumatic line coupling 320 is threadably attached to the back-up plate 258 and the back-up plate includes a pneumatic passage line 322 which communicates through the back-up plate with the piston chamber 323 in cylinder 266. Pneumatic line coupling 324, which is threadably attached to the magazine plate 282, communicates through pneumatic passage line 326 with the rod end 278 of the piston. The piston rod 278 includes an axial passage 328 for relatively closing the base member and nose assembly, as described hereinbelow.

The back-up plate 258 also includes a pneumatic sensing line or passage 330 which communicates through line 332 with the actuation means of the die press assembly. Pneumatic line 332 is connected to the back-up plate by coupling 334. Self-attaching fasteners 300 are fed from the first fastener passage 294 to the conical opening 304 by timed pneumatic pressure through pneumatic line 336. Pneumatic line 336 communicates with the first fastener passage 294 through angled passage 338. When a fastener is located in the position shown at 300a, a burst of pressure through line 336 and passage 338 will propel a fastener located at 300a to the conical opening 304, ready for installation. The stop mechanism 342, however, prevents entry of a fastener to the ready position shown at 300a until the fastener located in the conical opening 304 has been installed. The stop mechanism includes a stop plate or bracket 344 which is secured to the base member 252 by a screw 346 or other fastening means. The stop mechanism includes two spaced stop plates 348 secured to the bracket 344. The stop plates 348 each include key hole slots which permit one fastener to reach the position shown at 300a only when the installation head apparatus is opened to the position shown in FIG. 15, as will be described more fully in regard to FIGS. 20 to 25.

FIG. 16 shows the details of the plunger assembly. As shown, the plunger 260 includes an axial bore 350 which telescopically receives the shank portion 370 of the self-attaching stud fastener and an annular end portion 352 which bearingly engages the head or body portion 372 of the fastener. As described above, the fastener also includes a self-piercing and riveting annular wall or skirt portion 374.

As best shown in FIG. 16, the axial bore 350 at the free end of the plunger 260 communicates with a second smaller axial bore 355 which receives a first pin 356 having a head portion 358 telescopically disposed in a slightly larger bore 359. A second cylindrical pin is telescopically received in longitudinal bore 359 and supported on the head 358 of the first pin 356. As shown, the end of the first pin 356 opposite the head 358 is disposed in the bore 350 in the end of the plunger, such that the pins 356 and 360 are moved upwardly in FIG. 16 when the shank 370 of a stud fastener is disposed in bore 350, as shown in FIG. 19. The assembly also includes a proximity switch 362 having a wire 364 to the control of the actuation means as described below.

Figure 17:
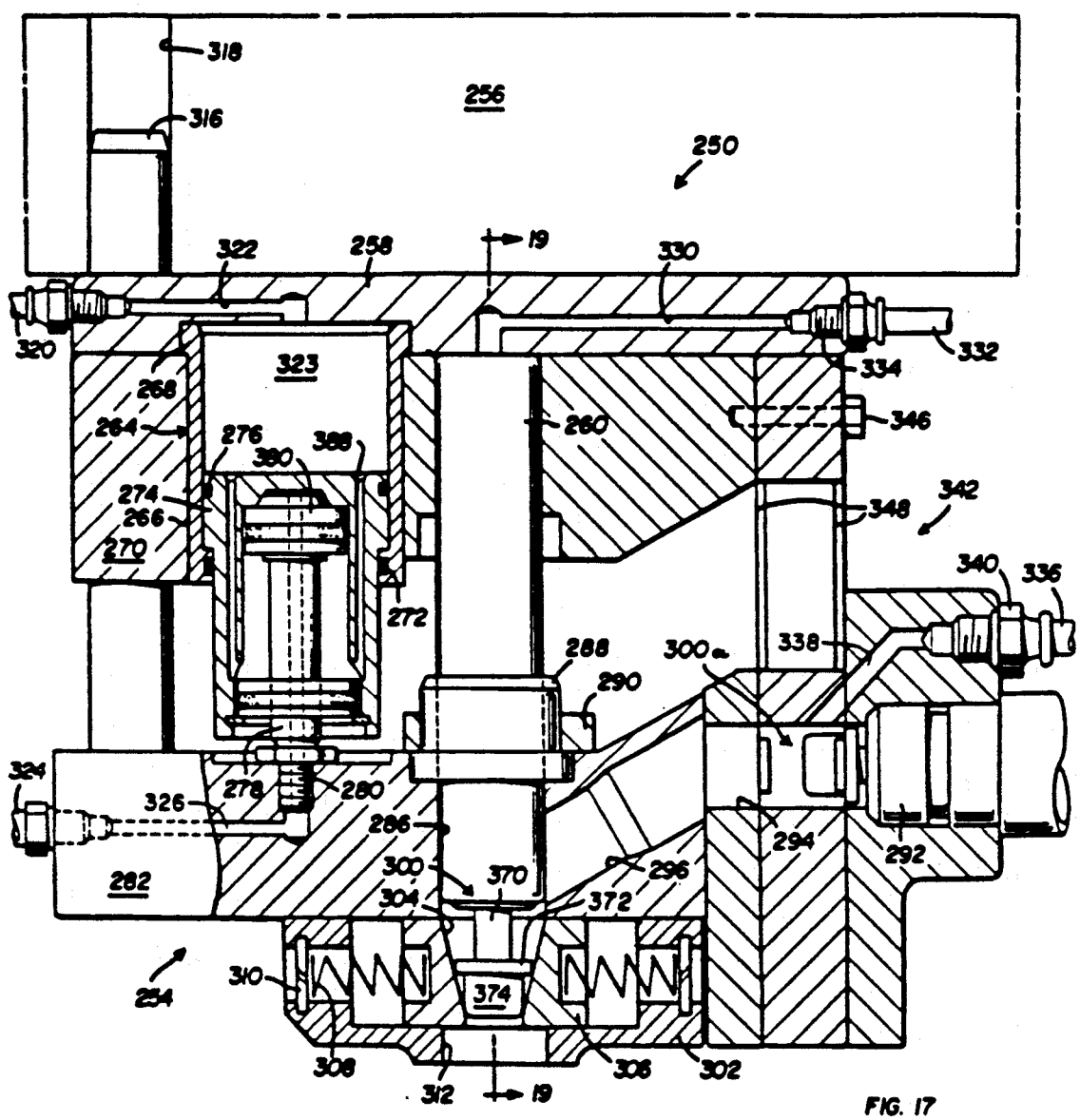
FIG. 17 is a partially cross-sectioned side view of the installation head apparatus shown in FIG. 15 in a further stage in the sequence of installation.

As best shown in FIG. 15, the double acting piston 264 includes an internal piston 380 reciprocable in internal chamber 382 having an O-ring seal 384 and a ring bearing 386. The external piston head 274 also includes a series of ports 388 which provide communication between chamber 323 and the chamber defined between internal piston head 380 and ring seal 386. Pressure is continuously provided through pneumatic line 320 and passage 322 to piston chamber 323. In the open position shown in FIG. 15, pneumatic pressure is also supplied through passage 326 in the magazine plate 282 and through the axial passage 328 in the rod end 278 of the piston into chamber 382. Pressure in chamber 382 bears against the internal piston head 380, extending the piston assembly as shown in FIG. 15. When the pressure in passage 326 is removed, however, the pressure in chamber 323 is communicated through ports 388, moving piston head 380 upwardly to relatively close the nose assembly 254 toward the base member 252, as shown in FIG. 17. The operation of the installation head apparatus shown in FIGS. 15 to 19 may now be described.

The double action pneumatic piston assembly 264 opens and closes the assembly, as described, and serves as a spring means. Upon opening of the die press assembly following installation of a stud fastener, the base member 252 and nose assembly 254 are spaced, as shown in FIG. 15 by pressurizing both of passages 322 and 326. A stud fastener is then located in the position shown in phantom at 300a and a burst of pressure through pneumatic line 340 transfers the stud fastener to the conical opening 304, as described above, where the fastener is automatically centered and oriented in the conical opening. As shown in FIG. 15, the conical opening receives the self-piercing and riveting annular wall 374 of the fastener and the fastener is normally oriented with the shank portion coaxially aligned with the axis of the plunger 260.

The control mechanism of the installation head apparatus then stops supplying pressure to passage 326, which relatively closes the nose assembly 254 toward base member 252 as shown in FIGS. 17 and 19, and described above. In this position, the free end of the stud fastener shank 370 is disposed in the axial bore 350 in the end of the plunger 260 against the end of the first pin 356. The first pin 356 and the second pin 360 is thus raised upwardly in FIG. 19 to close proximity switch 362. The closing of the proximity switch 362 thus assures that a stud fastener is located in the conical opening 304 of the nose 302 and the stud fastener is accurately oriented and aligned with the plunger ready for installation. As described above, any misalignment of the stud fastener may damage the installation apparatus, requiring down time and substantial repair of the assembly. Further, as described, the actuation of the proximity switch assures that a fastener is located in the nose assembly, ready for installation.

The final installation of the stud fastener follows the actuation of the die press assembly by pneumatic sensing line 330, wherein the upper die shoe 256 is moved toward the lower die shoe, not shown. As described above, the lower die shoe includes the die button as shown in FIG. 3, or more preferably, as shown in FIG. 12. As described, the die member 180 (FIG. 12) is fixed relative to the lower die shoe with the central projecting die portion 184 in coaxial alignment with the plunger passage 286 and telescopically receivable in the self-piercing and riveting annular wall 374 of the fastener. When the nose assembly engages the panel, the movement of the nose assembly 254 stops and the plunger 260 moves relative to the nose assembly to first engage the annular end 352 of the plunger against the head 372 of the stud fastener. The fastener is then driven through the nose assembly, spreading slide members 306 against springs 308, installing a fastener in a panel located on the die button as shown in the sequence of FIGS. 7 to 11 and 14.

FIGS. 20 to 25 illustrate an alternative embodiment of the installation head apparatus particularly suitable for installing self-attaching stud-like fasteners. As defined above, "stud fasteners" is intended to be generic to any self-attaching fastener of this invention having a projecting end portion, including threaded bolts, screws, studs having an unthreaded shank portion, and similar fasteners, including ball fasteners and the like.

Referring now to FIG. 20, the disclosed installation head apparatus 400 includes a plunger assembly 402 and a shuttle-feed assembly 404. The plunger assembly includes an upper plunger 406, which is fixed relative to an upper die shoe platen 408. The upper plunger 406 reciprocates in a cylindrical guide cartridge 410 having a chamber 432, and includes a piston head 412 which is sealed relative to the inner wall of the cylinder guide cartridge by an O-ring seal 414, or the like. The piston head 412 is attached to the intermediate portion 418 of the upper plunger by a retaining ring 416. The upper plunger also includes an annular lower end portion 420 which receives the split lower plunger assembly 442, as described hereinbelow.

An internal piston 422 is reciprocably disposed in an axial cylindrical bore 424 in the upper plunger 406. The internal piston 422 includes a head portion 426 and an annular bearing 428 which are sealed within the chamber 424 by O-ring seals or the like. The upper piston head 412 reciprocates in a cylindrical chamber 432 in the cylindrical guide cartridge 410 and the upper end of the cylindrical guide cartridge includes a snap ring 434 and seal 436 limiting upward movement of the upper plunger 406. An O-ring spacer 438 is also provided at the lower end of the cylinder die cartridge 410, which seals against the annular lower end portion 412 of the upper plunger. The cylinder guide cartridge 410 is fixed at its lower end to a stripper plate 440 by many suitable means, including dowel pins or the like. As described, the annular lower end portion 420 of the upper plunger 406 receives the split lower plunger assembly 442. The lower plunger assembly includes a first lower plunger member 444 and a mating second plunger member 446 which includes an upper annular end portion 448 which is normally spaced from the lower plunger member 444, as shown in FIG. 20, and the rod end 450 of the internal piston 422 engages the top of the annular end 448 of the first lower plunger member 444. A stop pin 452 and stop ring 454 limits upward axial movement of the second plunger member 446, as will be described hereinbelow. The lower end of the split lower plunger assembly reciprocates in the plunger passage 458 of the installation head of the nose 456.

Pneumatic pressure, which opens the plunger assembly 402, is received through pneumatic pressure line 460, which is attached to the cylinder guide cartridge 410 by a conventional pneumatic fitting 462, such that pneumatic line 460 communicates with the chamber 432 in the cylinder guide cartridge 410 and the chamber 464 in the upper plunger 406 through passages 465 and 467. The internal chamber 464 is sealed by a plug 466. The plunger assembly 402 is normally spaced in the open position shown in FIG. 20 when the die press is opened by coil spring 468 or any other suitable spring means.

Self-attaching stud fasteners 300 are fed to the shuttle-feed assembly 404 through flexible tube 470. As described above, the stud fasteners each include a projecting shank portion 370, a head or body portion 372 and a self-piercing and riveting annular wall or skirt portion 374. The stud fasteners are first received in a tube adapter 472 having a bore or chamber 474 which initially receives the fasteners. The stop assembly 476 then transfers the stud fasteners one at a time to the shuttle mechanism. As best shown in FIG. 22, the stop assembly includes an upper plate 478 having a key hole slot 480. The end opening to the key hole slot includes a beveled edge 482, preventing jamming of the fastener, as described below. The stop assembly also includes a lower block member 484 having a lower projecting plate portion 486 extending generally parallel to the upper plate 478. The upper plate is attached to the lower block member by screws 488 or other suitable fastening means. It will be understood that the head portion 372 of the stud fasteners will pass through the enlarged opening of the key hole slot 480, but the lower plate portion 486 is located opposite the enlarged opening.

The stud bolts 300 are fed to the plunger by a shuttle, including a shuttle block 490 having a conventional pneumatic piston 492. Pneumatic piston 492 includes a threaded nipple 494 threadably attached to the shuttle block 490. Pneumatic pressure line 496 is attached to and communicates with the pneumatic piston 492 to extend and retract the piston rod 498. The piston rod 498 includes a threaded end 500 which is threadably attached to the shuttle 502 and secured by a nut 504. A coil spring 506 is received in opposed bore openings 508 and 510 in the shuttle block 490 and the lower block member 484 of the stop assembly, respectively. The coil spring 506 normally spring biases the stop assembly to the left in FIG. 20, however stop pin 512 in shuttle 502 prevents lateral movement of the stop assembly until the shuttle 502 is extended, as described below.

The movement of the shuttle 502 is guided in the disclosed embodiment by a shuttle guide 520 having a rail 522 and a stop tab 524 extending from the bottom of the shuttle guide. The shuttle guide 520 is attached to a stop plate 526 by any suitable means, including screws. The stop plate includes a slot or groove 528 which receives the end of the lower projecting plate 486 of the stop assembly 476. The stop plate 526 is attached to support plate 530 and the support plate is attached to the stripper plate 440. As shown in FIG. 20, the end of the upper plate 478 of the stop assembly is received on top of the support plate 530.

FIG. 21 illustrates certain details of the nose and split lower plunger assembly. As shown, the first lower plunger member 444 includes one or more small rod magnets 532 which securely but releasably retain the shank 370 of the stud fastener upon receipt of the stud fastener in the first lower plunger member. Spring biased balls 534 press the shank portion of the stud fastener against the magnets. The balls are spring biased by small coil springs 536, which are retained by screws or plugs 538. As a further assurance of location and orientation of a stud fastener ready for installation, a conventional photoreflection sensing means 540 may be provided in the plunger passage.

Having described the elements of the installation head apparatus of FIGS. 20 to 25, it is now possible to describe the operation. As set forth above, FIG. 20 illustrates the installation head when the die press is fully opened, following the installation of a self-attaching fastener. The installation head is "opened" as shown in FIG. 20 by actuating pneumatic pressure line 460, which transmits pressure to chamber 432 and chamber 464 through passages 465 and 467. Chamber 464 has the greater volume, extending plunger 406. Stop pin 452 then engages stop ring 454, limiting upward movement of the assembly. A stud fastener is then located in the shuttle 502. The stud fastener previously in the split plunger assembly 442 has been installed in a panel and the panel has been removed. As described above, a female die is located on the lower stationary die member, not shown, with the center projecting die portion coaxially aligned with the plunger. It is very important that the die button be securely retained on the die member opposite the installation head apparatus. A panel is then inserted in the die press over the die button, ready for receipt of a self-attaching fastener. In most applications, the panel will also be fixed relative to the stationary die member to prevent any movement of the panel during the installation of the self-attaching fastener. Further, as described above, the panel may be formed in the die press simultaneously with the installation of the self-attaching fastener. The forming of the panel may be accomplished in a single stroke, or a progressive die may be utilized.

Figure 23:
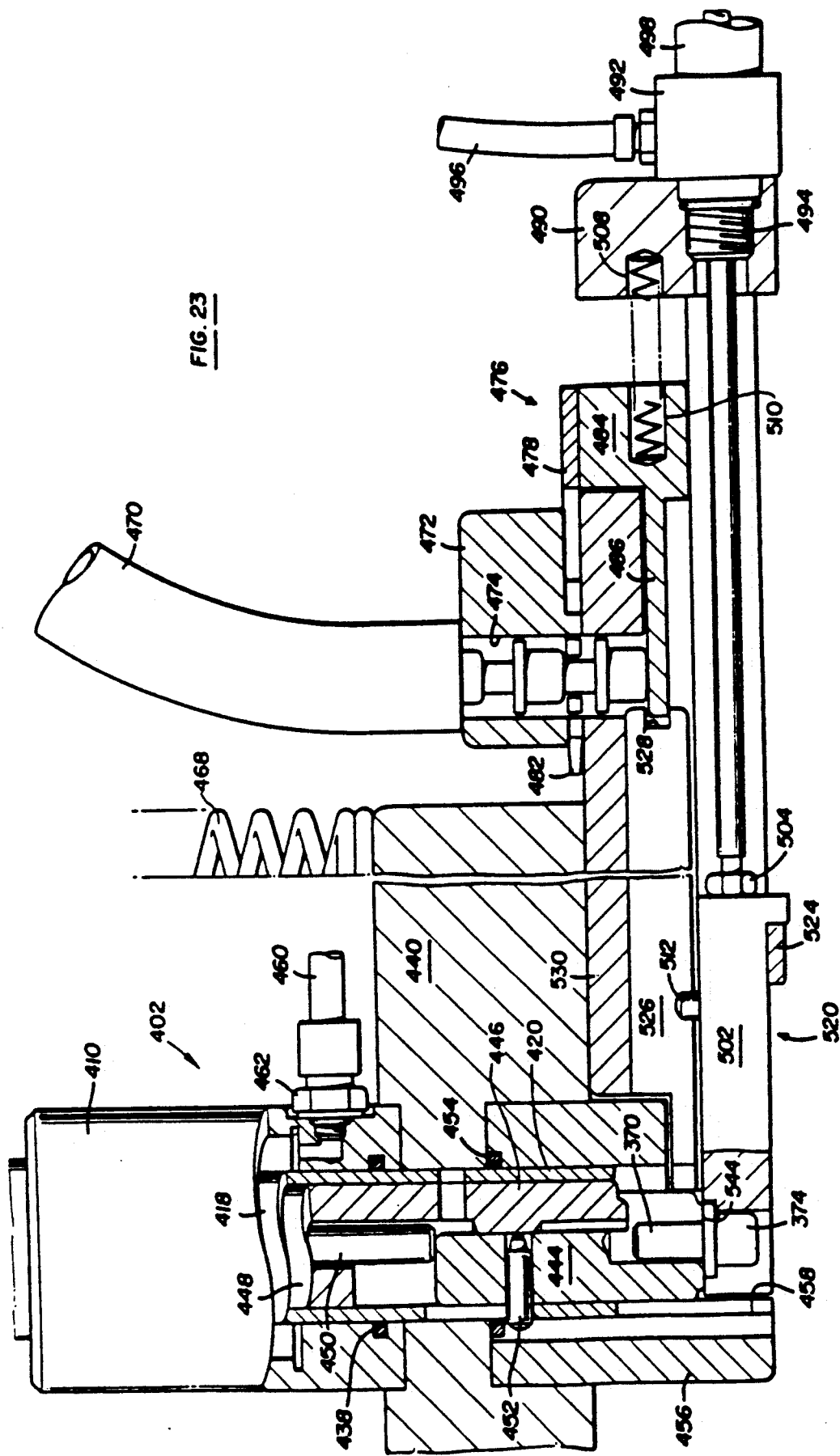
FIGS. 23 to 25 are partially cross-sectioned side elevations of the installation head apparatus shown in FIG. 20 illustrating the sequence of installation of the self-attaching fastener in the head apparatus.
Figure 24:
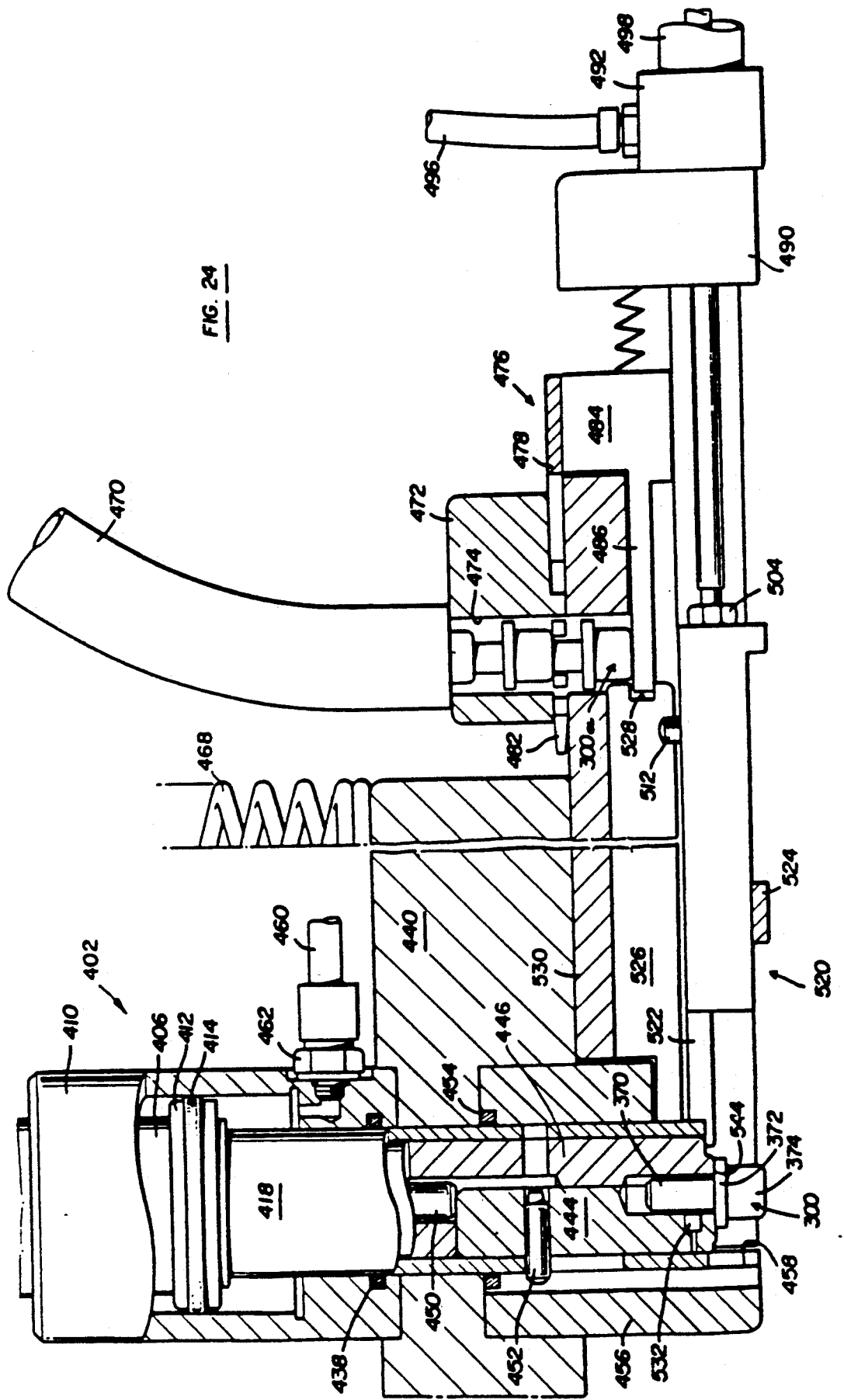

The shuttle piston 492 is first actuated by actuating pneumatic line 496. The piston moves the shuttle 502 to the left in FIG. 20, moving a stud fastener 300 from the position shown in FIG. 20 to the position shown in FIG. 23. The shuttle 502 forces the shank 370 of the fastener past the ball detents 534 (see FIG. 21) into engagement with the rod magnets 532. The movement of the shuttle 502 is limited by stop 524, as shown in FIG. 23. The movement of the shuttle also releases the stop assembly 476 which had been retained by stop pin 512, as shown in FIG. 20. The stop assembly 476 is then biased by spring 506 to the left, as shown in FIG. 23, releasing a stud fastener from the position shown at 300a in FIG. 20, through the enlarged opening of the key hole slot 480 and against the lower projecting plate portion 486 of the stop assembly, as shown in FIG. 23. As described above, a photoreflection sensing means 540 may be utilized to assure the location of a fastener in the first lower plunger member 444, ready for installation. The die press is then actuated, lowering the upper platen 408, which closes the split plunger assembly as shown in FIG. 24. The upper plunger 406 is thereby pressed into the cylindrical cartridge guide 410 which presses against the upper annular portion 418 of the second lower plunger member 446, closing the split plunger assembly and closing the axial bore 542 in the end of the lower plunger as shown in FIG. 24. As described above, the plunger includes an annular end portion 544, which bears against the head or body portion 372 of the stud fastener, which is retained in place by the rod magnets 532. It is noted that the shuttle 502 is simultaneously retracted by piston 492, such that the next stud fastener is ready for installation upon completion of the sequence. The plunger assembly is now interlocked to act as an integral unit and the stud fastener is now ready for installation as shown in FIG. 25.

Figure 25:
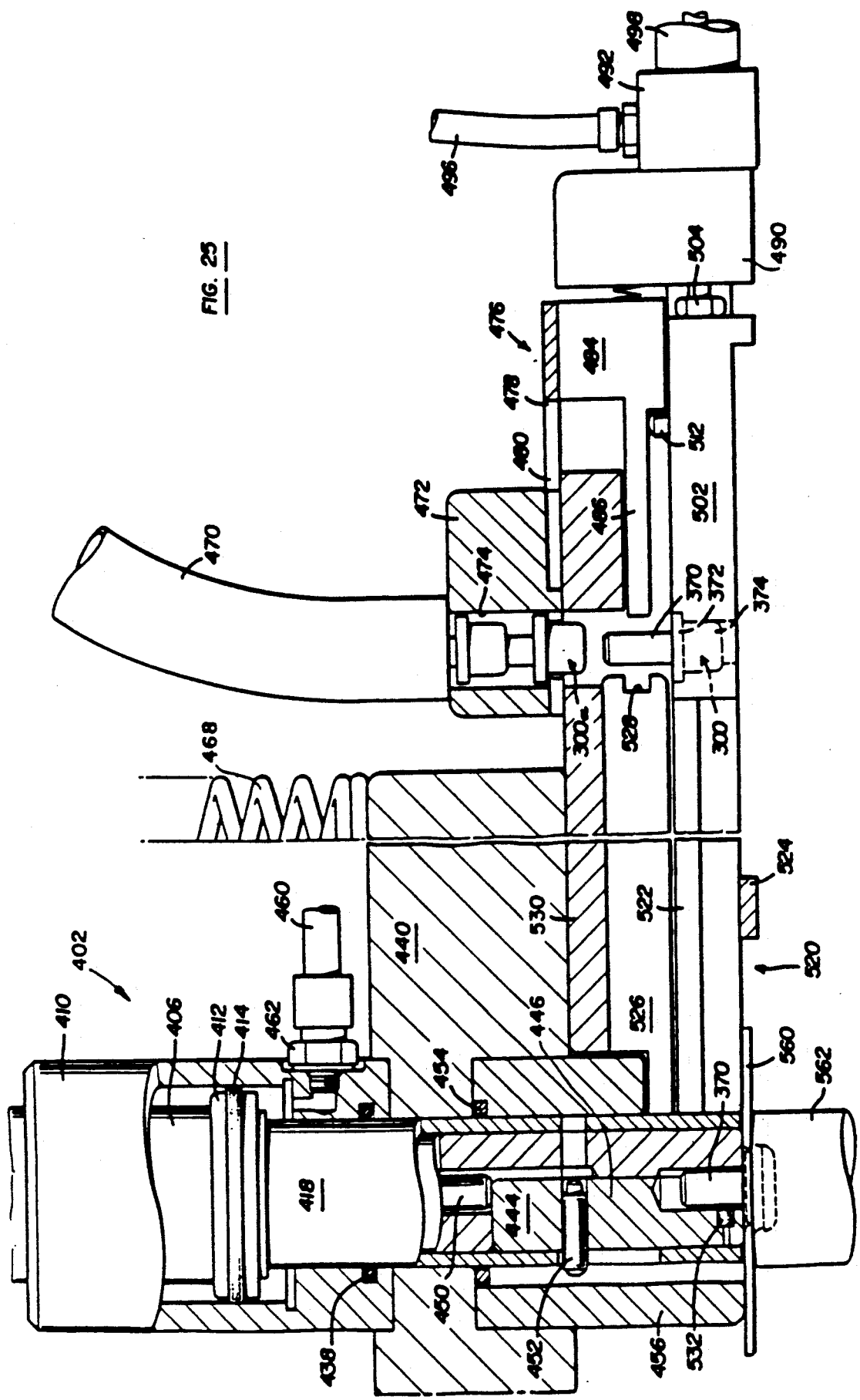

In the final installation, the upper die show platen 408 engages the upper plunger 406, driving the self-piercing and riveting wall 374 into a panel 560 located on the die button 562, as shown in FIG. 25. The shuttle is now fully retracted and a stud fastener is dropped into the shuttle, as shown. It should be noted that the plunger assembly 402 thus serves as an air spring, damping the assembly. Upon opening of the die press, the assembly is returned to the position shown in FIG. 20 by the plunger assembly and coil spring 468 and a fastener is now located in the shuttle, ready to repeat the sequence described hereinabove.

Figure 26:
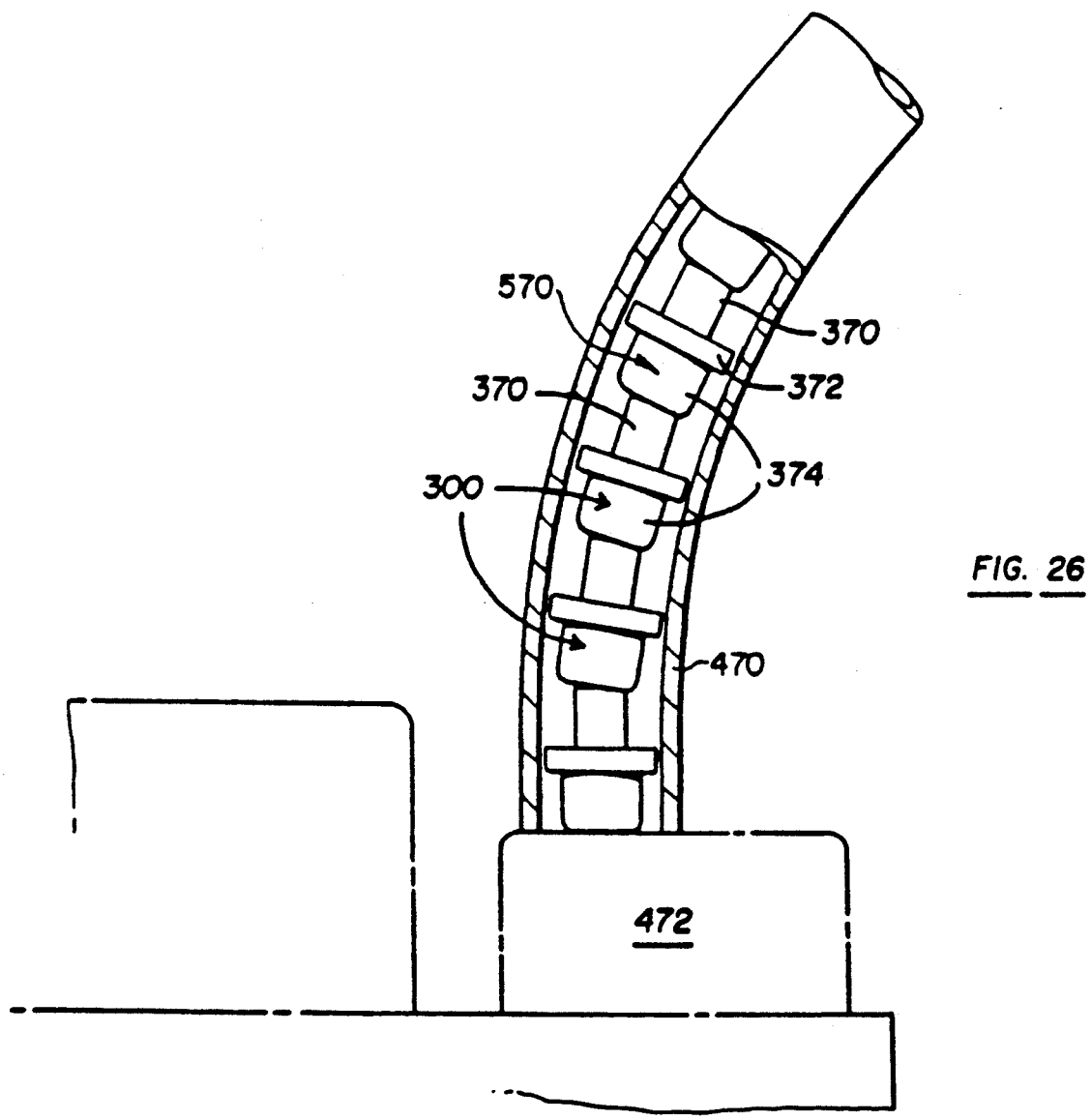
FIG. 26 is a partially cross-sectioned side elevation of a stack of stud-like fasteners of this invention in a flexible transfer tube.

FIG. 26 illustrates the unique stacking feature of the self-piercing studs 300 of this invention. As described above in regard to the feeding of the self-piercing studs to the installation head apparatus disclosed in FIGS. 15 to 25, the studs may be fed to the installation heads 250 or 400 through a flexible tube under pneumatic pressure. For ease of reference, the stack of stud fasteners 570 is shown feeding the installation head shown in FIGS. 20 to 24, however, it will be understood that the same relationship exists with the installation head apparatus disclosed in FIGS. 15 to 19.

As described above, the stud fasteners 300 are preferably fed to the installation head through a flexible tube 470. In the embodiment of the installation head shown in FIGS. 20 to 25, the fasteners are fed to a tube adapter 472. Each stud fastener includes a tube-shaped self-piercing and riveting annular wall or skirt portion 374, a head or body portion 372 and a shank portion 370. In the preferred embodiment, the tubular annular wall 374 has an internal diameter greater than the diameter of the shank portion 370 and the length of the shank portion 370 is greater than the depth of the recess in the tubular head portion 372, such that a "flexible" stack of fasteners 570 is formed capable of being fed through a flexible tube 470, as described. It will be understood that the flexible tube 470 communicates with a source of stud fasteners, such as a conventional hopper and that the fasteners are fed into the tube under pneumatic pressure. The stacking feature of the stud fasteners of this invention facilitates mass production of the installation of the fasteners in an installation head apparatus, as described.

Figure 27:
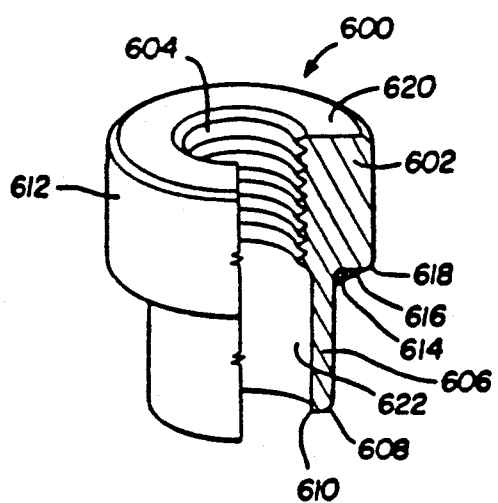
FIG. 27 is a partially cross-sectioned side elevation of another embodiment of the self-attaching fastener of this invention in the form of a nut.
Figure 28:
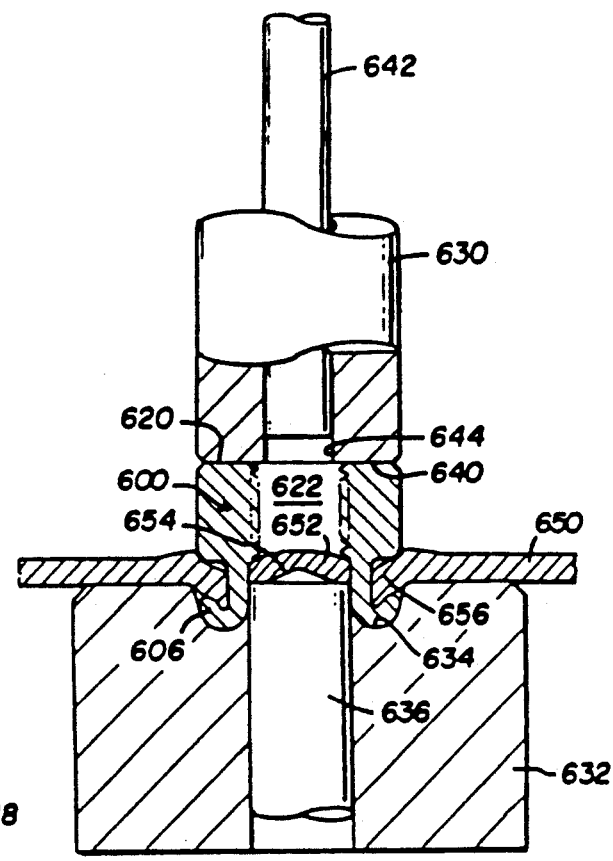
FIG. 28 is a partially cross-sectioned side elevation of the self-attaching nut fastener shown in FIG. 27 following installation in an alternative embodiment of the installation apparatus of this invention; and, FIG. 29 is a partially cross-sectioned side elevation of the self-attaching nut fastener and installation apparatus shown in FIG. 28 in the final step of the installation.
Figure 29:
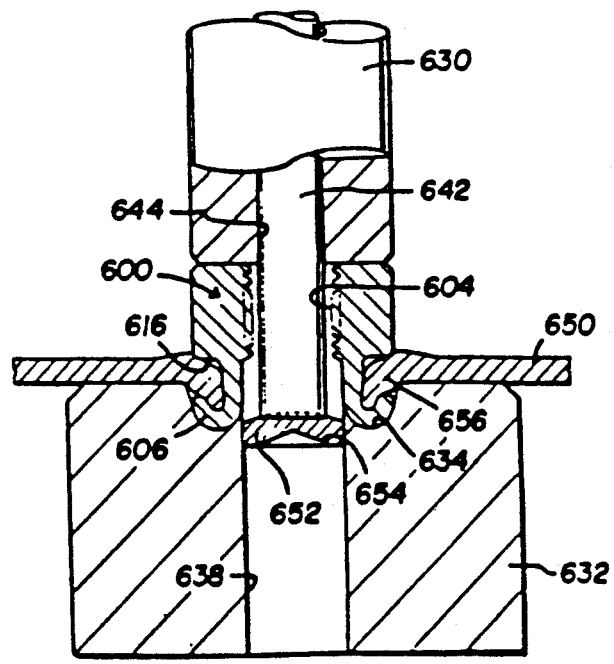

FIGS. 27 to 29 illustrate a further embodiment of the self-attaching fastener of this invention, in the form of a nut fastener 600. The disclosed embodiment of the nut fastener 600 includes a head or body portion 602 having a threaded bore 604 and a self-piercing and riveting annular wall or skirt portion 606. The annular skirt portion includes a free end having a rounded driving and drawing surface 608 and a piercing surface 610 at the inner edge of the annular wall as described above in regard to FIGS. 1 and 2. The annular wall 606 is preferably joined to the body portion 602 spaced inwardly from the outer surface 612 in an arcuate surface 614, thereby defining an annular bearing surface 616. Further, the outer edge of the body portion 618 adjacent the annular bearing surface 616, is preferably arcuate for the reasons given hereinabove. The opposed end of the body portion includes an annular pressing or driving surface 620 for driving the fastener into a panel, as described hereinbelow. The internal surface 622 of the annular wall is preferably smooth, as described hereinabove.

FIGS. 28 and 29 illustrate one method of installing the self-attaching nut fastener 600 of FIG. 27. As will be understood from the description of FIGS. 5, 6, 8 to 11 and 14, above, the installation apparatus includes a pressing die or plunger 630 and a female die 632. The female die 632 preferably includes a semi-toroidal die cavity 634 and a separate counter-hole die 636. The counter die 636 is telescopically received in a bore 638, which is coaxially aligned with the axis of the semi-toroidal die cavity 634. The pressing die or plunger 630 includes an annular end surface 640, which engages the annular pressing surface 620 of the nut, and a ram or plunger 642 which is telescopically received in an axial bore 644 in the pressing die 630.

As described above in regard to the stud-like fasteners, the nut fastener 600 is first located opposite a panel 650 with the self-piercing and riveting wall 606 coaxially aligned with the die cavity 634. The annular wall 606 is then driven into the panel and the die cavity to pierce a slug 652 from the panel. The slug 652 is centered upon the conical projecting end portion 654 of the counter-hole die member 636. The panel slug 652 is then disposed into the recess 622 in the annular wall and the free end of the annular wall is deformed in the die cavity 636 to form a mechanical interlock between the panel portion adjacent the pierced panel edge 656 and the preferably hook or U-shaped annular wall, as shown in FIG. 28. As described above, the panel slug is located on the counter-hole die at the point of greatest stress, thereby preventing collapse of the annular wall 606 during the radial outward deformation of the annular wall. The nut and panel assembly is now complete, however the panel slug 652 must be removed to permit use of the permanently installed nut 600. This is accomplished by driving the ram or plunger 642 of the pressing member through the threaded bore 604 of the nut, driving the panel slug 652 out of the annular wall recess. It will be understood that the panel slug may be driven out of the recess by counter-hole die 636 if the threads 604 are recessed from the internal surface 622 of the annular wall.

The method of installing the self-attaching nut fastener 600 may thus be the same as the methods of installing the stud fasteners described hereinabove, except that the panel slug is driven out of the annular wall recess following completion of the nut fastener and panel assembly. Further, various anti-rotation means may be provided, including flats on the internal surface of the die cavity 634 or the bearing surface 622 may include ribs or indents preventing rotation. Where anti-rotation means are provided on the bearing surface 616, the body portion is preferably driven into the panel, as shown in FIG. 29.

Having described the preferred embodiments of the self-attaching fastener, method of installation and installation apparatus of this invention, it will be understood that various modifications may be made within the purview of the appended claims. The dimensions of the self-attaching fastener, for example, will depend upon the particular application and panel thickness. As described above, the self-attaching fastener of this invention is particularly adapted for permanent attachment to relatively thin panels, such as utilized for structural components in the automotive and appliance industries. For example, an M5 self-attaching bolt having a thread diameter of 0.1968 inches may be attached to panels having a thickness of 0.0315 to 0.0591 inches, providing a relatively rigid installation. An M10 self-attaching bolt having a thread diameter of 0.3937 inches is suitable for attachment in panels having a thickness ranging from 0.0394 to 0.0984 inches or 1 to 2.5 millimeters. Further, as described above, the bottom wall of the stud fastener recess is preferably conical and convex as shown in FIGS. 1 and 3 to 6 where the panel is relatively thin in the ranges given hereinabove to assure that the panel slug is deformed radially outwardly into engagement with the inner surface of the annular wall. Where the panel is relatively thick, the bottom surface of the annular wall cavity is preferably conical and concave as shown in FIGS. 7 to 11 and 14, assuring complete installation and avoiding damage to the die button. The self-attaching fasteners may be formed of any suitable material, preferably steel, such as the materials presently used for manufacturing conventional studs, bolts, screws and nuts. A suitable material for the self-attaching fasteners of this invention is typically medium carbon steels, including SAE 1022, 1023 and 1030 steels.

I now claim:

1. An installation apparatus for installing self-piercing and riveting fasteners in a panel, each fastener having an elongated body portion and a self-piercing and riveting annular wall portion extending from said body portion in generally coaxial alignment, said installation apparatus comprising:

a housing having an elongated plunger reciprocable in a plunger passage, a feed transfer means transferring said fasteners in a path transverse to and intersecting said plunger passage, said plunger having a longitudinally extending bore configured to receive said of one of said fasteners elongated body portion and an end portion adapted to bear against said fastener annular wall portion, said plunger formed of at least two longitudinally extending parts intersecting said bore including a first part having a concave portion of said bore facing said transfer means path and a second relatively moveable part adapted to close said bore and block said path, said apparatus including actuation means adapted to longitudinally move said second plunger part relative to said first plunger part thereby opening said concave bore portion of said first plunger part, said transfer means then transferring a fastener to receive said fastener longitudinal body portion in said plunger first part bore portion locating said fastener oriented for installation, said actuating means then closing said second plunger part around said fastener elongated body portion ready for installation, said actuating means then actuating said plunger to drive said plunger through said plunger passage and install said oriented fastener in a panel located opposite said plunger passage.

2. The installation apparatus as defined in claim 1, characterized in that said fasteners are stud fastners, each including an elongated shank portion, an annular wall portion coaxially aligned with said shank portion, and a radial flange located between said shank and annular wall portions, said plunger bore being generally cylindrical and extending through said plunger end portion, said plunger first part including up to one-half said cylindrical bore facing said transfer means path.

3. The installation apparatus as defined in claim 2, characterized in that said actuation means includes a pneumatic spring means moving said plunger second part relative to said plunger first part to open said plunger bore to receive a fastener.

4. The installation apparatus as defined in claim 1, characterized in that said transfer means includes a shuttle means extending generally perpendicular to said plunger passage, said shuttle means transferring fasteners to said plunger.

5. The installation apparatus as defined in claim 4, characterized in that said installation apparatus includes a chute communicating with a source of generally oriented fasteners and said shuttle means, said chute including stop means allowing only one fastener at a time to be received in said shuttle means.

6. The installation apparatus as defined in claim 5, wherein said fasteners are stud fasteners, each fastener including a shank portion and a radial flange portion located between said shank portion and said annular wall portion said chute comprising a flexible cylindrical tube containing a plurality of stacked stud fasteners each having a shank portion received in the adjacent annular wall portion.

7. An installation apparatus for installing riveting elements in a panel, said riveting elements each having a body portion and an annular riveting portion, said installation apparatus comprising:

an installation head having a plunger passage extending therethrough, an elongated plunger reciprocally supported in said plunger passage for reciprocal axial movement therein, said plunger including a free end, said plunger free end having an axial opening configured to receive the body portion of one of said riveting elements, a feed transfer means transferring said riveting elements in a feed path laterally intersecting said plunger free end portion, said plunger split axially through said free end axial opening into at least two components including a first plunger component adjacent said feed path blocking receipt of said riveting elements in said plunger passage and a second plunger component, and actuating means adapted to axially move said first plunger component, to receive a riveting element in said second plunger component free end axial opening, said transfer means then transferring a riveting element into said plunger passage with said riveting element body portion received in said second plunger component axial opening, said actuating means then relatively axially moving said one plunger component to close said plunger component free end axial opening around said riveting element body portion, and said actuating means then driving said plunger and said riveting element through said plunger passage to attach said riveting element in a panel located opposite said plunger passage.

8. The installation apparatus defined in claim 7, characterized in that said riveting elements each include an elongated shank portion, an annular wall portion coaxially aligned with said shank portion and a radial flange portion located between said shank and annular wall portions, said plunger free end including an annular end portion configured to engage a riveting element radial flange portion and said opening being generally cylindrical to receive said elongated shank portion.

9. The installation apparatus defined in claim 7, characterized in that said actuating means includes a pneumatic spring means moving said first plunger component relative to said second plunger component to receive a riveting element in said second plunger component axial opening.

10. The installation apparatus as defined in claim 7, characterized in that said transfer means includes a shuttle means extending generally perpendicular to said plunger passage, said shuttle means transferring said riveting elements to said plunger passage.

11. The installation apparatus as defined in claim 10, characterized in that said installation apparatus includes a chute communicating with a source of generally oriented riveting elements and said shuttle means, said chute including a stop means allowing only one riveting element at a time to be received in said shuttle means.

12. The installation apparatus as defined in claim 11, wherein said riveting elements each include a shank portion and a radial flange portion located between said shank portion and said annular riveting portion, said chute comprising a flexible cylindrical tube containing a plurality of stacked riveting elements each having a shank portion received in the adjacent annular riveting portion.

* * * * *